(12) United States Patent
Baar et al.

(10) Patent No.: US 9,760,235 B2
(45) Date of Patent: Sep. 12, 2017

(54) LENS-DEFINED ADJUSTMENT OF DISPLAYS

(75) Inventors: David J. P. Baar, Vancouver (CA);
Timothy Lochner, Vancouver (CA);
Garth B. D. Shoemaker, Vancouver (CA); Andrew Carlisle, Vancouver (CA); Andrew Skiers, N. Vancouver (CA); Zeenat Jetha, N. Vancouver (CA)

(73) Assignee: CALLAHAN CELLULAR L.L.C., Wilmington, DE (US)

( * ) Notice: Subject to any disclaimer, the term of this patent is extended or adjusted under 35 U.S.C. 154(b) by 1413 days.

(21) Appl. No.: 12/368,268

(22) Filed: Feb. 9, 2009
(Under 37 CFR 1.47)

(65) Prior Publication Data
US 2009/0284542 A1    Nov. 19, 2009

Related U.S. Application Data

(63) Continuation-in-part of application No. 11/443,124, filed on May 31, 2006, now Pat. No. 7,489,321.
(Continued)

(30) Foreign Application Priority Data

Jun. 12, 2001 (CA) .................................... 2350342
Jul. 16, 2002 (CA) .................................... 2393708
Jul. 18, 2002 (CA) .................................... 2394119

(51) Int. Cl.
*G06F 3/0481* (2013.01)
*G09G 5/14* (2006.01)

(52) U.S. Cl.
CPC .............. *G06F 3/0481* (2013.01); *G09G 5/14* (2013.01); *G06F 2203/04805* (2013.01);
(Continued)

(58) Field of Classification Search
CPC .. G06F 2203/04806; G09G 2340/0407; G09G 2340/045
(Continued)

(56) References Cited

U.S. PATENT DOCUMENTS 3,201,546 A    8/1965 Richardson
3,704,938 A    12/1972 Fanselow
(Continued)

FOREIGN PATENT DOCUMENTS

CA    2350342    11/2002
CA    2386560    11/2003
(Continued)

OTHER PUBLICATIONS

Carpendale, Sheelagh et al., "Achieving Higher Magnification in Context", UIST '04, Oct. 24-27, 2004, vol. 6, Issue 2, pp. 1-10.*
(Continued)

*Primary Examiner* — Chante Harrison
(74) *Attorney, Agent, or Firm* — McAndrews, Held & Malloy, Ltd.

(57) ABSTRACT

In an implementation, an image is distorted for display on a display device to give an appearance of a lens being applied to the image. A brightness level of the appearance of the lens for display on the display device is adjusted such that the brightness level of the appearance of the lens differs from a brightness level of the portion of the image that surrounds the appearance of the lens.

18 Claims, 16 Drawing Sheets

Related U.S. Application Data which is a continuation of application No. 10/614,754, filed on Jul. 8, 2003, now Pat. No. 7,084,886, application No. 12/368,268, which is a continuation-in-part of application No. 11/691,686, filed on Mar. 27, 2007, which is a continuation of application No. 10/166,736, filed on Jun. 12, 2002, now Pat. No. 7,213,214.

(60) Provisional application No. 61/033,042, filed on Mar. 3, 2008.

(52) U.S. Cl.
CPC ............ G06F 2203/04806 (2013.01); G09G 2340/045 (2013.01); G09G 2340/0407 (2013.01)

(58) Field of Classification Search
USPC ........... 345/660, 619, 629, 76, 77, 690, 647; 715/781
See application file for complete search history.

(56) References Cited

U.S. PATENT DOCUMENTS

| | | |
|---|---|---|
| 3,739,739 A | 6/1973 | Brase |
| 3,762,799 A | 10/1973 | Shapiro |
| 4,581,647 A | 4/1986 | Vye |
| 4,630,110 A | 12/1986 | Cotton et al. |
| 4,688,181 A | 8/1987 | Cottrell et al. |
| 4,757,616 A | 7/1988 | Hills |
| 4,790,028 A | 12/1988 | Ramage |
| 4,800,379 A | 1/1989 | Yeomans |
| 4,885,702 A | 12/1989 | Ohba |
| 4,888,713 A | 12/1989 | Falk |
| 4,970,028 A | 11/1990 | Kenyon et al. |
| 4,985,849 A | 1/1991 | Hideaki |
| 4,992,866 A | 2/1991 | Morgan |
| 5,031,918 A | 7/1991 | Brill |
| 5,048,077 A | 9/1991 | Wells et al. |
| 5,175,808 A | 12/1992 | Sayre |
| 5,185,599 A | 2/1993 | Dorrnink et al. |
| 5,185,667 A | 2/1993 | Zimmerman |
| 5,200,818 A | 4/1993 | Neta et al. |
| 5,206,721 A | 4/1993 | Ashida et al. |
| 5,227,771 A | 7/1993 | Kerr et al. |
| 5,250,934 A | 10/1993 | Denber et al. |
| 5,258,837 A | 11/1993 | Gormley |
| 5,269,687 A | 12/1993 | Mott et al. |
| 5,275,019 A | 1/1994 | Pagani |
| 5,309,279 A | 5/1994 | Halstead |
| 5,321,807 A | 6/1994 | Mumford |
| 5,329,310 A | 7/1994 | Liljegren et al. |
| 5,341,466 A | 8/1994 | Perlin et al. |
| 5,369,527 A | 11/1994 | McCracken |
| 5,416,900 A | 5/1995 | Blanchard et al. |
| 5,425,137 A * | 6/1995 | Mohan .................... G06T 11/00 345/619 |
| 5,432,895 A | 7/1995 | Myers |
| 5,451,998 A | 9/1995 | Hamrick |
| 5,459,488 A | 10/1995 | Geiser |
| 5,473,740 A | 12/1995 | Kasson |
| 5,521,634 A | 5/1996 | McGary |
| 5,523,783 A | 6/1996 | Cho |
| 5,528,289 A | 6/1996 | Cortjens et al. |
| 5,539,534 A | 7/1996 | Hino et al. |
| 5,581,670 A | 12/1996 | Bier et al. |
| 5,583,977 A | 12/1996 | Seidl |
| 5,588,098 A | 12/1996 | Chen et al. |
| 5,594,859 A | 1/1997 | Palmer et al. |
| 5,596,690 A | 1/1997 | Stone et al. |
| 5,598,297 A | 1/1997 | Yamanaka et al. |
| 5,610,653 A | 3/1997 | Abecassis |
| 5,613,032 A | 3/1997 | Cruz et al. |
| 5,638,523 A | 6/1997 | Mullet et al. |
| 5,644,758 A | 7/1997 | Patrick |
| 5,651,107 A | 7/1997 | Frank et al. |
| 5,652,851 A | 7/1997 | Stone et al. |
| 5,657,246 A | 8/1997 | Hogan et al. |
| 5,670,984 A | 9/1997 | Robertson et al. |
| 5,680,524 A | 10/1997 | Maples et al. |
| 5,682,489 A | 10/1997 | Harrow et al. |
| 5,689,287 A | 11/1997 | Mackinlay et al. |
| 5,689,628 A | 11/1997 | Robertson |
| 5,721,853 A | 2/1998 | Smith |
| 5,729,673 A | 3/1998 | Cooper et al. |
| 5,731,805 A | 3/1998 | Tognazzini et al. |
| 5,742,272 A | 4/1998 | Kitamura et al. |
| 5,745,166 A | 4/1998 | Rhodes et al. |
| 5,751,289 A | 5/1998 | Myers |
| 5,754,348 A | 5/1998 | Soohoo |
| 5,764,139 A | 6/1998 | Nojima et al. |
| 5,786,814 A | 7/1998 | Moran et al. |
| 5,798,752 A | 8/1998 | Buxton et al. |
| 5,808,670 A | 9/1998 | Oyashiki et al. |
| 5,812,111 A | 9/1998 | Fuji et al. |
| 5,818,455 A | 10/1998 | Stone et al. |
| 5,848,231 A | 12/1998 | Teitelbaum et al. |
| 5,852,440 A | 12/1998 | Grossman et al. |
| 5,872,922 A | 2/1999 | Hogan et al. |
| 5,909,219 A | 6/1999 | Dye |
| 5,923,364 A | 7/1999 | Rhodes et al. |
| 5,926,209 A | 7/1999 | Glatt |
| 5,949,430 A | 9/1999 | Robertson et al. |
| 5,950,216 A | 9/1999 | Amro et al. |
| 5,959,605 A | 9/1999 | Gilblom |
| 5,960,108 A * | 9/1999 | Xiong .................. G06T 3/0062 382/154 |
| 5,969,706 A | 10/1999 | Tanimoto et al. |
| 5,973,694 A | 10/1999 | Steele et al. |
| 5,991,877 A | 11/1999 | Luckenbaugh |
| 5,999,879 A | 12/1999 | Yano |
| 6,005,611 A | 12/1999 | Gullichsen et al. |
| 6,037,939 A | 3/2000 | Kashiwagi et al. |
| 6,052,110 A | 4/2000 | Sciammarella et al. |
| 6,057,844 A | 5/2000 | Strauss |
| 6,064,401 A | 5/2000 | Holzman et al. |
| 6,067,372 A | 5/2000 | Gur et al. |
| 6,072,501 A | 6/2000 | Bier |
| 6,073,036 A | 6/2000 | Heikkinen et al. |
| 6,075,531 A | 6/2000 | DeStefano |
| 6,081,277 A | 6/2000 | Kojima |
| 6,084,598 A | 7/2000 | Chekerylla |
| 6,091,771 A | 7/2000 | Seeley et al. |
| 6,108,005 A | 8/2000 | Starks et al. |
| 6,128,024 A | 10/2000 | Carver et al. |
| 6,133,914 A | 10/2000 | Rogers et al. |
| 6,147,709 A | 11/2000 | Martin et al. |
| 6,154,840 A | 11/2000 | Pebley et al. |
| 6,160,553 A | 12/2000 | Robertson et al. |
| 6,184,859 B1 | 2/2001 | Kojima |
| 6,198,484 B1 | 3/2001 | Kameyama |
| 6,201,546 B1 | 3/2001 | Bodor et al. |
| 6,201,548 B1 | 3/2001 | Cariffe et al. |
| 6,204,845 B1 | 3/2001 | Bates et al. |
| 6,204,850 B1 | 3/2001 | Green |
| 6,215,491 B1 | 4/2001 | Gould |
| 6,219,052 B1 | 4/2001 | Gould |
| 6,241,609 B1 | 6/2001 | Rutgers |
| 6,246,411 B1 | 6/2001 | Strauss |
| 6,249,281 B1 | 6/2001 | Chen et al. |
| 6,256,043 B1 | 7/2001 | Aho et al. |
| 6,256,115 B1 | 7/2001 | Adler et al. |
| 6,256,737 B1 | 7/2001 | Bianco et al. |
| 6,266,082 B1 | 7/2001 | Yonezawa et al. |
| 6,271,854 B1 | 8/2001 | Light |
| 6,278,443 B1 | 8/2001 | Amro et al. |
| 6,278,450 B1 | 8/2001 | Arcuri et al. |
| 6,288,702 B1 | 9/2001 | Tachibana et al. |
| 6,304,271 B1 | 10/2001 | Nehme |
| 6,307,612 B1 | 10/2001 | Smith et al. |
| 6,320,599 B1 | 11/2001 | Sciammarella et al. |
| 6,337,709 B1 | 1/2002 | Yamaashi et al. |

(56) References Cited

U.S. PATENT DOCUMENTS

| | | |
|---|---|---|
| 6,346,938 B1 | 2/2002 | Chan et al. |
| 6,346,962 B1 | 2/2002 | Goodridge |
| 6,359,615 B1 | 3/2002 | Singh |
| 6,381,583 B1 | 4/2002 | Kenney |
| 6,384,849 B1 | 5/2002 | Morcos et al. |
| 6,392,661 B1 | 5/2002 | Tankersley |
| 6,396,648 B1 | 5/2002 | Yamamoto et al. |
| 6,396,962 B1 | 5/2002 | Haffey et al. |
| 6,400,848 B1 | 6/2002 | Gallagher |
| 6,407,747 B1 | 6/2002 | Chui et al. |
| 6,411,274 B2 | 6/2002 | Watanabe et al. |
| 6,416,186 B1 | 7/2002 | Nakamura |
| 6,417,867 B1 | 7/2002 | Hallberg |
| 6,438,576 B1 | 8/2002 | Huang et al. |
| 6,487,497 B2 | 11/2002 | Khavakh et al. |
| 6,491,585 B1 | 12/2002 | Miyamoto et al. |
| 6,504,535 B1 | 1/2003 | Edmark |
| 6,515,663 B1 | 2/2003 | Hung et al. |
| 6,515,678 B1 | 2/2003 | Boger |
| 6,522,341 B1 | 2/2003 | Nagata |
| 6,523,024 B1 | 2/2003 | Yajima et al. |
| 6,542,191 B1 | 4/2003 | Yonezawa |
| 6,552,737 B1 | 4/2003 | Tanaka et al. |
| 6,559,813 B1 | 5/2003 | DeLuca et al. |
| 6,577,311 B1 | 6/2003 | Crosby et al. |
| 6,577,319 B1 | 6/2003 | Kashiwagi et al. |
| 6,584,237 B1 | 6/2003 | Abe |
| 6,590,568 B1 | 7/2003 | Astala et al. |
| 6,590,583 B2 | 7/2003 | Soohoo |
| 6,608,631 B1 | 8/2003 | Milliron |
| 6,612,930 B2 | 9/2003 | Kawagoe et al. |
| 6,631,205 B1 | 10/2003 | Melen et al. |
| 6,633,305 B1 | 10/2003 | Sarfeld |
| 6,690,387 B2 | 2/2004 | Zimmerman et al. |
| 6,704,034 B1 | 3/2004 | Rodriguez et al. |
| 6,720,971 B1 | 4/2004 | Yamamoto et al. |
| 6,721,655 B1 | 4/2004 | Utsumi |
| 6,727,910 B2 | 4/2004 | Tigges |
| 6,731,285 B2 | 5/2004 | Matchen |
| 6,731,315 B1 | 5/2004 | Ma et al. |
| 6,744,430 B1 | 6/2004 | Shimizu |
| 6,747,610 B1 | 6/2004 | Taima et al. |
| 6,747,611 B1 | 6/2004 | Budd et al. |
| 6,760,020 B1 | 7/2004 | Uchiyama et al. |
| 6,768,497 B2 | 7/2004 | Baar et al. |
| 6,798,412 B2 | 9/2004 | Cowperthwaite |
| 6,833,843 B2 | 12/2004 | Mojaver et al. |
| 6,842,175 B1 | 1/2005 | Schmalstieg et al. |
| 6,874,126 B1 | 3/2005 | Lapidous |
| 6,882,755 B2 | 4/2005 | Silverstein et al. |
| 6,906,643 B2 | 6/2005 | Samadani et al. |
| 6,911,975 B2 | 6/2005 | Iizuka et al. |
| 6,919,921 B1 | 7/2005 | Morota et al. |
| 6,924,822 B2 | 8/2005 | Card et al. |
| 6,938,218 B1 | 8/2005 | Rosen |
| 6,956,590 B1 | 10/2005 | Barton et al. |
| 6,961,071 B2 | 11/2005 | Montagnese et al. |
| 6,975,335 B2 | 12/2005 | Watanabe |
| 6,985,865 B1 | 1/2006 | Packingham et al. |
| 7,038,680 B2 | 5/2006 | Pitkow |
| 7,055,095 B1 | 5/2006 | Anwar |
| 7,071,971 B2 | 7/2006 | Elberbaum |
| 7,084,886 B2 | 8/2006 | Jetha et al. |
| 7,088,364 B2 | 8/2006 | Lantin |
| 7,106,349 B2 | 9/2006 | Baar et al. |
| 7,133,054 B2 | 11/2006 | Aguera y Arcas |
| 7,134,092 B2 | 11/2006 | Fung et al. |
| 7,158,878 B2 | 1/2007 | Rasmussen |
| 7,173,633 B2 | 2/2007 | Tigges |
| 7,173,636 B2 | 2/2007 | Montagnese |
| 7,194,697 B2 | 3/2007 | Sinclair, II et al. |
| 7,197,718 B1 | 3/2007 | Westerman et al. |
| 7,197,719 B2 | 3/2007 | Doyle et al. |
| 7,213,214 B2 | 5/2007 | Baar et al |
| 7,233,942 B2 | 6/2007 | Nye |
| 7,246,109 B1 | 7/2007 | Ramaswamy |
| 7,256,801 B2 | 8/2007 | Baar et al. |
| 7,274,381 B2 | 9/2007 | Mojaver et al. |
| 7,275,219 B2 | 9/2007 | Shoemaker |
| 7,280,105 B2 | 10/2007 | Cowperthwaite |
| 7,283,141 B2 | 10/2007 | Baar et al. |
| 7,310,619 B2 | 12/2007 | Baar et al. |
| 7,312,806 B2 | 12/2007 | Tigges |
| 7,321,824 B1 | 1/2008 | Nesbitt |
| 7,411,610 B2 | 8/2008 | Doyle |
| 7,423,660 B2 | 9/2008 | Ouchi et al. |
| 7,443,396 B2 | 10/2008 | Ilic |
| 7,450,114 B2 | 11/2008 | Anwar |
| 7,472,354 B2 | 12/2008 | Jetha et al. |
| 7,486,302 B2 | 2/2009 | Shoemaker |
| 7,489,321 B2 | 2/2009 | Jetha et al. |
| 7,493,572 B2 | 2/2009 | Card et al. |
| 7,495,678 B2 | 2/2009 | Doyle et al. |
| 7,580,036 B2 | 8/2009 | Montagnese |
| 7,667,699 B2 | 2/2010 | Komar |
| 7,698,653 B2 | 4/2010 | Roman et al. |
| 7,714,859 B2 | 5/2010 | Shoemaker |
| 7,737,976 B2 | 6/2010 | Lantin |
| 7,761,713 B2 | 7/2010 | Baar |
| 7,773,101 B2 | 8/2010 | Shoemaker |
| 2001/0040585 A1 | 11/2001 | Hartford et al. |
| 2001/0040636 A1 | 11/2001 | Kato et al. |
| 2001/0048447 A1 | 12/2001 | Jogo |
| 2001/0055030 A1 | 12/2001 | Han |
| 2002/0033837 A1 | 3/2002 | Munro |
| 2002/0038257 A1 | 3/2002 | Joseph et al. |
| 2002/0044154 A1 | 4/2002 | Baar et al. |
| 2002/0062245 A1 | 5/2002 | Niu et al. |
| 2002/0075280 A1 | 6/2002 | Tigges |
| 2002/0087894 A1 | 7/2002 | Foley et al. |
| 2002/0089520 A1 | 7/2002 | Baar |
| 2002/0093567 A1 | 7/2002 | Cromer et al. |
| 2002/0101396 A1 | 8/2002 | Huston et al. |
| 2002/0122038 A1 | 9/2002 | Cowperthwaite |
| 2002/0135601 A1 | 9/2002 | Watanabe et al. |
| 2002/0143826 A1 | 10/2002 | Day et al. |
| 2002/0171644 A1 | 11/2002 | Reshetov et al. |
| 2002/0180801 A1 | 12/2002 | Doyle et al. |
| 2003/0006995 A1 | 1/2003 | Smith et al. |
| 2003/0007006 A1 | 1/2003 | Baar et al. |
| 2003/0048447 A1 | 3/2003 | Harju et al. |
| 2003/0052896 A1 | 3/2003 | Higgins et al. |
| 2003/0052900 A1 | 3/2003 | Card et al. |
| 2003/0061211 A1 | 3/2003 | Shultz et al. |
| 2003/0076363 A1 | 4/2003 | Murphy |
| 2003/0100326 A1 | 5/2003 | Grube et al. |
| 2003/0103063 A1 | 6/2003 | Mojaver et al. |
| 2003/0105795 A1 | 6/2003 | Anderson et al. |
| 2003/0112503 A1 | 6/2003 | Lantin |
| 2003/0118223 A1 | 6/2003 | Rahn et al. |
| 2003/0137525 A1 | 7/2003 | Smith |
| 2003/0151625 A1 | 8/2003 | Shoemaker |
| 2003/0151626 A1 | 8/2003 | Komar et al. |
| 2003/0174146 A1 | 9/2003 | Kenoyer |
| 2003/0179198 A1 | 9/2003 | Uchiyama |
| 2003/0179219 A1 | 9/2003 | Nakano et al. |
| 2003/0179237 A1 | 9/2003 | Nelson et al. |
| 2003/0196114 A1 | 10/2003 | Brew et al. |
| 2003/0210281 A1 | 11/2003 | Ellis et al. |
| 2003/0227556 A1 | 12/2003 | Doyle |
| 2003/0231177 A1 | 12/2003 | Montagnese et al. |
| 2004/0026521 A1 | 2/2004 | Colas et al. |
| 2004/0056869 A1 | 3/2004 | Jetha et al. |
| 2004/0056898 A1 | 3/2004 | Jetha et al. |
| 2004/0111332 A1 | 6/2004 | Baar et al. |
| 2004/0125138 A1 | 7/2004 | Jetha et al. |
| 2004/0150664 A1 | 8/2004 | Baudisch |
| 2004/0194014 A1 | 9/2004 | Anwar |
| 2004/0217979 A1 | 11/2004 | Baar et al. |
| 2004/0240709 A1 | 12/2004 | Shoemaker |
| 2004/0257375 A1 | 12/2004 | Cowperthwaite |
| 2004/0257380 A1 | 12/2004 | Herbert et al. |
| 2005/0041046 A1 | 2/2005 | Baar et al. |
| 2005/0134610 A1 | 6/2005 | Doyle et al. |

(56) References Cited

U.S. PATENT DOCUMENTS

| | | | |
|---|---|---|---|
| 2005/0259118 A1 | 11/2005 | Mojaver et al. | |
| 2005/0278378 A1 | 12/2005 | Frank | |
| 2005/0285861 A1 | 12/2005 | Fraser | |
| 2006/0022955 A1 | 2/2006 | Kennedy | |
| 2006/0026521 A1 | 2/2006 | Hotelling et al. | |
| 2006/0033762 A1* | 2/2006 | Card et al. | 345/660 |
| 2006/0036629 A1 | 2/2006 | Gray | |
| 2006/0059432 A1 | 3/2006 | Bells | |
| 2006/0082901 A1 | 4/2006 | Shoemaker | |
| 2006/0098028 A1 | 5/2006 | Baar | |
| 2006/0139375 A1 | 6/2006 | Rasmussen et al. | |
| 2006/0192780 A1 | 8/2006 | Lantin | |
| 2006/0214951 A1 | 9/2006 | Baar et al. | |
| 2007/0033543 A1 | 2/2007 | Ngari et al. | |
| 2007/0064018 A1 | 3/2007 | Shoemaker et al. | |
| 2007/0097109 A1 | 5/2007 | Shoemaker et al. | |
| 2009/0141044 A1 | 6/2009 | Shoemaker | |
| 2009/0147023 A1 | 6/2009 | Jetha et al. | |
| 2009/0167789 A1* | 7/2009 | Kerofsky | 345/690 |
| 2009/0172587 A1 | 7/2009 | Carlisle | |
| 2009/0265656 A1 | 10/2009 | Jetha | |
| 2010/0026718 A1 | 2/2010 | Jetha | |
| 2010/0033503 A1 | 2/2010 | Baar | |
| 2010/0045702 A1 | 2/2010 | Doyle | |
| 2010/0201785 A1 | 8/2010 | Lantin | |
| 2010/0208968 A1 | 8/2010 | Shoemaker et al. | |
| 2010/0262907 A1 | 10/2010 | Shoemaker et al. | |
| 2010/0277401 A1* | 11/2010 | Takahara et al. | 345/76 |
| 2011/0161861 A1* | 6/2011 | Abramson et al. | 715/781 |

FOREIGN PATENT DOCUMENTS

| | | |
|---|---|---|
| CA | 2393708 | 1/2004 |
| CA | 2394119 | 1/2004 |
| EP | 0635779 | 1/1995 |
| EP | 0650144 | 4/1995 |
| EP | 0816983 | 7/1998 |
| JP | 4410465 | 2/2010 |

OTHER PUBLICATIONS

"BPAI Decision", U.S. Appl. No. 10/682,298, (Dec. 30, 2009),14 pages.

"Notice of Allowance", U.S. Appl. No. 11/410,024, (Jan. 4, 2010),7 pages.

"Final Office Action" U.S. Appl. No. 11/673,038, (Jan. 8, 2010), 33 pages.

"Advisory Action", U.S. Appl. No. 11/541,778, (Feb. 1, 2010), 3 pages.

"Advisory Action", U.S. Appl. No. 11/935,222, (Feb. 4, 2010), 3 pages.

"Restriction Requirement", U.S. Appl. No. 12/368,263, (Mar. 9, 2010), 7 pages.

"Notice of Allowance", U.S. Appl. No. 10/705,199, (Mar. 10, 2010),18 pages.

"Non Final Office Action", U.S. Appl. No. 11/691,686, (Mar. 18, 2010),17 pages.

"Non Final Office Action", U.S. Appl. No. 11/541,778, (Jun. 19, 2009),36 pages.

"Non Final Office Action", U.S. Appl. No. 11/673,038, (Jul. 13, 2009),45 pages.

"Non Final Office Action", U.S. Appl. No. 11/410,024, (Jul. 20, 2009),27 pages.

Smith, et al., "Efficient techniques for wide-angle stereo vision using surface projection models", Retrieved from <http://ieee.org/stamp.jsp?arnumber=17045, (1999),6 pages.

"Non Final Office Action", U.S. Appl. No. 11/159,205, (Jul. 27, 2009),28 pages.

Robertson, et al., ""The Document Lens"", (1993),pp. 101-108.

Carpendale, Marianne Sheelagh T., ""A Framework for Elastic Presentation Space"", Simon Fraser University, Burnaby; British Columbia XP001051168; cited in the application figures 2.13, 3.1-3.31, 4.1-4.19, 5.14,(1999),pp. 7, 14, 34, 38, 65, 112, 123, and 126.

"Non Final OA", U.S. Appl. No. 11/935,222, (Feb. 20, 2009),12 pages.

Carpendale, M.S.T et al., ""A Framework for Unifying Presentation Space"", 01UIST. *Proceedings of the 14th Annual ACM Symposium on User Interface Software and Technology, Proceedings of UIST '01: ACM Symposium on User Interface Software and Technology*, Orlando, FL, USA; XP002249323 2001, New York, NY, USA, ISBN: 1-58113-438-X,(Nov. 14, 2001),pp. 61-70; p. 64.

Ikedo, T ""A Realtime Video-Image Mapping User Polygon Rendering Techniques"", *IEEE Intl. conf on Ottawa, Ont, Canada* Jun. 3-6, 1997, Los Alamitos, CA, USA; IEEE Comput. Soc, US, XP010239181, ISBN: 0-8186-7819-4 Sections 2, 4.4; Multimedia Computing and Systems '97 Proceedings,(Jun. 3, 1997),pp. 127-134.

Bouju, A. et al., ""Client-Server Architecture for Accessing Multimedia and Geographic Databases within Embedded Systems"", *Database and Expert Systems Applications, 1999 Proceedings. Tenth International Workshop on Florence, Italy* Sep. 1-3, 1999, Los Alamitos, CA, USA, IEEE Comput. Soc, US, XP010352370; ISBN:0-7695-0281-4, abstract, figure 2,(Sep. 1-3, 1999),pp. 760-764.

Robertson, G et al., "The Document Lens", *UIST. Proceedings of the Annual ACM Symposium on User Interface Software and Technology*. abstract figures 3,4,(Nov. 3, 1993),pp. 101-108.

Dursteler, Juan C., "The digital magazine of InfoVis.net", Retrieved from: http://www.infovis.net/printMag.php?num=85&lang=2; (Apr. 22, 2002).

"Presentation for CGDI Workshop", Retrieved from: http://www.geoconnections.org/developersCorner/devCorner_devNetwork/meetings/2002.05.30/IDELIX_CGDI_20020530 dist.pdf, (May 2002).

Kuederle, Oliver ""Presentation of Image Sequences: A Detail-In-Context Approach"", Thesis, Simon Fraser University; (Aug. 2000),pp. 1-3, 5-10, 29-31.

Microsoft Corp., "Microsoft Paint", Microsoft Corp.,(1981-1998),Paint 1-14.

"Electronic Magnifying Glasses", *IBM Technical Disclosure Bulletin, IBM Corp., New York, US*, vol. 37, No. 3; XP000441501, ISSN: 0018-8689 the whole document; (Mar. 1, 1994),pp. 353-354.

Keahey, T. A., ""The Generalized Detail-In-Context Problem"", *Information Visualization 1998, Proceedings; IEEE Symposium on Research Triangle, CA, USA*; Los Alamitos, CA, USA, IEEE Comput. Soc, US; XP010313304; ISBN: 0-8186-9093,(Oct. 19-20, 1998),pp. 44-51, 152.

Carpendale, et al., ""3-Dimensional Pliable Surfaces: For the Effective Presentation of Visual Information"", *Proceedings of the 8th annual ACM symposium on User interface and software technology*; (Dec. 1995).

Carpendale, M S T et al., ""Extending distortion viewing from 2D to 3D"", *IEEE Computer Graphics and Applications, IEEE Inc.* New York, US, vol. 17, No. 4; XP000927815, ISSN: 0272-1716. (Jul. 1997),pp. 42-51.

Viega, J et al., ""3D magic lenses"", *Proceedings of the 9th annual ACM symposium on User interface software and technology*; Pub 1996 ACM Press New York, NY, USA; (1996),51-58.

Cowperthwaite, David J., ""Occlusion Resolution Operators for Three-Dimensional Detail-In-Context"", Burnaby, British Columbia: Simon Fraser University; (2000).

Carpendale, M.S.T. ""A Framework for Elastic Presentation Space"", Thesis Simon Fraser University, XP001051168; Chapter 3-5; appendix A,B; (Mar. 1999),pp. 1-271.

Carpendale, M.S.T. et al., ""Exploring Distinct Aspects of the Distortion Viewing Paradigm"", *Technical Report TR 97-08, School of Computer Science*, Simon Fraser University, Burnaby, British Columbia, Canada; (Sep. 1997).

Cowperthwaite, David J., et al., ""Visual Access for 3D Data"", in *Proceedings of ACM CHI 96 Conference on Human Factors in Computer Systems, vol. 2 of Short Papers: Alternative Methods of Interaction*; (1996),pp. 175-176.

(56) References Cited

OTHER PUBLICATIONS

Keahey, T. A., ""Visualization of High-Dimensional Clusters Using NonLinear Magnification"", Technical Report LA-UR-98/2776, Los Alamos National Laboratory; (1998).
Tigges, M. et al., ""Generalized Distance Metrics for Implicit Surface Modeling"", *Proceedings of the Tenth Western Computer Graphics Symposium*; (Mar. 1999).
Bossen, F. J., ""Anisotropic Mesh Generation With Particles"", Technical Report CMU-CS-96-134, CS Dept, Carnegie Mellon University; (May 1996).
Bossen, F. J., et al., ""A Pliant Method for Anisotropic Mesh Generation"", *5th Intl. Meshing Roundtable*; (Oct. 1996),pp. 63-74.
Wilson, et al., ""Direct Volume Rendering via 3D Textures"", Technical Report UCSC-CRL-94-19, University of California, Santa Cruz, Jack Baskin School of Engineering; (Jun. 1994).
Carpendale, M.S.T. "A Framework for Elastic Presentation Space", PhD thesis, Simon Fraser University; (1999),pp. 69, 72, 78-83,98-100, 240, and 241.
Keahey, T. A., et al., ""Techniques for Non-Linear Magnification Transformations"", *Information Visualization '96, Proceedings IEEE Symposium on*, San Francisco, CA, Los Alamitos, CA, USA, IEEE Comput. Soc, US: XP010201943; ISBN: 0-8186-7668-X the whole document,(Oct. 28, 1996),pp. 38-45.
Carpendale, M. Sheelagh T., et al., ""3-Dimensional Pliable Surfaces: For the Effective Presentation of Visual Information"", *UIST '95, 8th Annual Symposium on User Interface Software and Technology, Proceedings of the ACM Symposium on User Interface Software and Technology, Pittsburgh, PA, ACM Symposium on User Interface Software and Technology, New York*, Nov. 14, 1995 (1995-, (Nov. 14-17, 1995),pp. 217-226.
Tominski, Christian et al., ""Fisheye Tree Views and Lenses for Graph Visualization"", pp. 1-8.
Keahey, T. A., ""Getting Along: Composition of Visualization Paradigms"", *Visual Insights, Inc.*; (2001).
Sakamoto, Chikara et al., ""Design and Implementation of a Parallel Pthread Library (PPL) with Parallelism and Portability"", *Systems and Computers in Japan*, New York, US, vol. 29, No. 2; XP000752780, ISSN: 0882-1666 abstract,(Feb. 1, 1998),pp. 28-35.
Deng, K. et al., ""Texture Mapping with a Jacobian-Based Spatially-Variant Filter",", *Proceedings 10th Pacific Conference on Computer Graphics and Applications*, Beijing, China, 2002 Los Alamitos, CA, USA, IEEE Comput. Soc, USA; XP00224932, ISBN; 0-7695-1784-6 the whole document,(Oct. 9-11, 2002),pp. 460-461.
Welsh, Michelle "Futurewave Software", *Business Wire*; (Nov. 15, 1993).
Lamar, et al., "A Magnification Lens for Interactive Volume Visualization", *ACM*; pp. 1-10.
Fitzmaurice, G. et al., ""Tracking Menus"", *UIST*; (2003),pp. 71-79.
Stone, et al., "The movable filter as a user interface tool", *Proceedings of CHI ACM*; (1992),pp. 306-312.
Baudisch, P. et al., ""Halo: a Technique for Visualizing Off-Screen Locations"", *CHI*; (Apr. 5-10, 2003).
Baudisch, P. et al., ""Drag-And-Pop: Techniques for Accessing Remote Screen Content on Touch-And-Pen-Operated Systems"", *Interact '03*, (2003).
Carpendale, M.S.T. et al., ""Making Distortions Comprehensible"", *Visual Languages, Proceedings, 1997 IEEE Symposium on Isle of Capri, Italy*, Sep. 23-26, 1997, Los Alamitos, CA, USA, IEEE Comput. Soc., US, Sep. 23, 1997 (Sep. 23, 1997); XP010250566, ISBN: 0-8186-8144-6,(Sep. 23-26, 1997),pp. 36-45.
Ito, Minoru et al., ""A Three-Level Checkerboard Pattern (TCP) Projection Method for Curved Surface Measurement"", *Pattern Recognition, Pergamon Press Inc.*, Elmsford, N.Y., US vol. 28, No. 1; XP004014030, ISSN 0031-3203,(1995),pp. 27-40.
Keahey, T A., et al., ""Nonlinear Magnification Fields"", *Information Visualization, 1997, Proceedings, IEEE Symposium on Phoenix, AZ, USA*, Los Alamitos, CA, USA, IEEE Comput. Soc., US; XP010257169; ISBN: 0-8186-8189-6,(Oct. 20-21, 1997),pp. 51-58 and 121.

Rauschenbach, U. ""The Rectangular Fish Eye View as an Efficient Method for the Transmission and Display of Large Images"", *Image Processing, ICIP 99, Proceedings, 1999 International Conference on*, Kobe, Japan, Oct. 24-28, 1999, Piscataway, NJ, USA, IEEE, US, XP010368852, ISBN 0-7803-5467-2 p. 115, left-hand column—p. 116, paragraph 3, p. 118, paragraph 7.1; (1999),pp. 115-119.
Keahey, T. A., "Nonlinear Magnification", (Indiana University Computer Science), (1997).
Boots, B. N., "Delauney Triangles: An Alternative Approach to Point Pattern Analysis", *Proc. Assoc. Am. Geogr. 6*, (1974),p. 26-29.
Sheelagh, M. et al., ""Distortion Viewing Techniques for 3-Dimensional Data"", *Information Visualization '96, Proceedings IEEE Symposium on San Francisco, CA, USA*, Los Alamitos, CA, USA, IEEE Comput. Soc, US Oct. 28, 1996 (Oct. 28, 1996); XP010201944; ISBN: 0-8186-7668-X,(Oct. 28-29, 1996),pp. 46-53, 119.
Leung, Y. K., et al., ""A Review and Taxonomy of Distortion-Oriented Presentation Techniques"", *ACM Transactions on Computer-Human Interaction*, 'Online! vol. 1, No. 2, XP002252314; Retrieved from the Internet: <URL:http://citeseer.nj.nec.com/leung94review.html> retrieved on Aug. 21, 2003! the whole document,(Jun. 1994),pp. 126-160.
"Non Final Office Action", U.S. Appl. No. 10/358,394, (Mar. 13, 2009).
Sarkar, et al., "Stretching the Rubber Sheet: A Metaphor for Viewing Large Layouts on Small Screens", *Proc. of the 6th annual ACM symp. on User interface software an technology*, Atlanta, GA, (Dec. 1993),p. 81-91.
Carpendale, et al., "Graph Folding: Extending Detail and Context Viewing into a Tool for Subgraph Comparisons", In *Proceedings of Graph Drawing 1995*, Passau, Germany, (1995),pp. 127-139.
Carpendale, M.S.T. "A Framework for Elastic Presentation Space", http://pages.cpsc.ucalgary.ca/~sheelagh/personal/thesis/, (Nov. 19, 1999).
"Non Final Office Action", U.S. Appl. No. 11/542,120, (Jan. 22, 2009),20 pages.
"Non-Final Office Action", U.S. Appl. No. 11/410,024, (Mar. 11, 2009),35 pages.
"Foreign Office Action", Application Serial No. 2002-536993, (Mar. 11, 2009),2 pages.
"Final Office Action", U.S. Appl. No. 11/691,686, (Nov. 22, 2010), 16 pages.
"Final Office Action", U.S. Appl. No. 11/935,222, (Nov. 24, 2009), 8 pages.
"Final Office Action", U.S. Appl. No. 11/541,778, (Dec. 4, 2009), 12 pages.
"Notice of Allowance", U.S. Appl. No. 11/214,886, (Dec. 15, 2009), 16 pages.
"Notice of Allowance", U.S. Appl. No. 11/401,349, (Apr. 17, 2009),35 pages.
Schmalstieg, Dieter et al., "Using transparent props for interaction with the virtual table", Proceedings of the 1999 symposium on Interactive 3D graphics.,(Apr. 26, 1999),8 pages.
"Final Office Action", U.S. Appl. No. 10/705,199, (May 12, 2009),46 pages.
"Non Final Office Action", U.S. Appl. No. 12/388,437, (Jun. 23, 2010), 7 pages.
"Non Final Office Action", U.S. Appl. No. 12/764,724, (Jul. 1, 2010), 20 pages.
"Non Final Office Action", U.S. Appl. No. 11/673,038, (Jul. 22, 2010), 39 pages.
"Final Office Action", U.S. Appl. No. 11/691,686, (Sep. 1, 2010), 16 pages.
"Non Final Office Action", U.S. Appl. No. 11/138,979, (Sep. 17, 2010), 11 pages.
"Advisory Action", U.S. Appl. No. 11/249,493, (Aug. 11, 2009),5 pages.
"Advisory Action", U.S. Appl. No. 10/705,199, (Aug. 18, 2009),5 pages.
"Restriction Requirement", U.S. Appl. No. 11/935,222, (Aug. 20, 2009),6 pages.
"Advisory Action", U.S. Appl. No. 11/249,493, (Sep. 14, 2009),4 pages.

(56) References Cited

OTHER PUBLICATIONS

"Non-Final Office Action", U.S. Appl. No. 12/364,450, (Sep. 30, 2009),10 pages.
"Notice of Allowance", U.S. Appl. No. 10/358,394, (Oct. 8, 2009),8 pages.
"Advisory Action", U.S. Appl. No. 11/673,038, (Mar. 25, 2010), 3 pages.
"Final Office Action", U.S. Appl. No. 11/159,205, (Mar. 25, 2010), 16 pages.
"Notice of Allowance", U.S. Appl. No. 12/364,450, (Apr. 19, 2010), 4 pages.
"Non-Final Office Action", U.S. Appl. No. 11/236,694, (Apr. 20, 2010), 9 pages.
"Non Final Office Action", U.S. Appl. No. 12/368,263, (Apr. 30, 2010), 8 pages.
"Non Final Office Action", U.S. Appl. No. 12/368,267, (Jun. 11, 2010), 12 pages.
"Notice of Allowability", U.S. Appl. No. 12/364,450, (Jun. 18, 2010), 2 pages.
"Non Final Office Action", U.S. Appl. No. 11/541,778, (Sep. 29, 2010), 10 pages.
"Non Final Office Action", U.S. Appl. No. 11/695,104, (Oct. 1, 2010), 9 pages.
"Final Office Action", U.S. Appl. No. 11/159,205, (Oct. 6, 2010), 16 pages.
"Non Final Office Action", U.S. Appl. No. 11/236,694, (Oct. 13, 2010), 16 pages.
Lieberman, Henry "Power of Ten Thousand—Navigating in Large Information Spaces", *Proceedings of the 7th annual ACM symposium on User interface software and technology*, Marina del Rey, California, United States, (Nov. 1994), pp. 15-16.
Mills, Michael et al., "A Magnifier Tool for Video Data", *Proceedings of the SIGCHI conference on Human factors in computing systems*, (1992), pp. 93-96.
Kline, Richard L., et al., "Improving GUI Accessibility for People with Low Vision", *Proceedings of the SIGCHI conference on Human factors in computing systems*, (1995), pp. 114-121.
Perlin, Ken et al., "Pad—an alternative approach to the computer interface", *International Conference on Computer Graphics and Interactive Techniques. Proceedings of the 20th annual conference on Computer graphics and interactive techniques.*, (1993), pp. 57-64.
Bier, Eric A., et al., "The Movable Filter as a User Interface Tool—The Video", *Conference on Human Factors in Computing Systems Conference companion on Human factors in computing systems*, (1995), pp. 413-414.
Bier, Eric A., et al., "Toolglass and Magic Lenses—The See-Through Interface", *International Conference on Computer Graphics and Interactive Techniques Proceedings of the 20th annual conference on Computer graphics and interactive technologies*, (1993), pp. 73-80.
Bier, Eric A., et al., "Toolglass and Magic Lenses—The See-Through Interface", *Conference on Human Factors in Computing Systems Conference companion on Human factors in computing systems*, (1994), pp. 445-446.
Kamba, Tomonari et al., "Using Small Screen Space More Efficiently",*CHI 96* Vancouver, BC Canada, (1996), pp. 383-390.
"Final Office Action", U.S. Appl. No. 12/368,263,(Nov. 5, 2010), 7 pages.
"Final Office Action", U.S. Appl. No. 12/764,724, (Nov. 9, 2010), 21 pages.

* cited by examiner

LENS-DEFINED ADJUSTMENT OF DISPLAYS

RELATED APPLICATIONS

This application claims priority as a continuation-in-part of: U.S. Provisional Application No. 61/033,042, filed Mar. 3, 2008; U.S. patent application Ser. No. 11/443,124, filed May 31, 2006, which is a continuation of U.S. patent application Ser. No. 10/614,754, filed Jul. 8, 2003 (now U.S. Pat. No. 7,084,886); and U.S. patent application Ser. No. 11/691,686, which is a continuation of U.S. patent application Ser. No. 10/166,736, filed Jun. 12, 2002 (now U.S. Pat. No. 7,213,214) which claims priority to Canadian Application No. 2350342 filed Jun. 12, 2001, the entire disclosures of each of these applications are incorporated herein by reference. This application also claims priority from Canadian Patent Application Nos. 2,393,708 and 2,394,119 filed Jul. 16, 2002, and Jul. 18, 2002, respectively, the entire disclosures of which are incorporated herein by reference.

BACKGROUND

Portable computing and communications devices including wireless devices, mobile devices, cellular telephones, personal digital assistants ("PDAs"), laptop computers, mobile data processing systems, portable global positioning system ("GPS") navigation devices, and other data processing systems have limited battery life due to weight and size constraints that limit the size of the battery that can be incorporated within these devices, as well as the demands placed on the battery by the central processing unit ("CPU"), display, wireless transceiver, etc., of these devices. Typically, the power used to drive and light the display of a portable device is a significant drain on the device's battery. Such displays can be, for example, backlit as in the case of a transmissive liquid crystal display ("LCD"), or locally light-emissive in nature, as in the case of a light emitting diode ("LED") technology based display. As such, a need exists for an improved method of reducing the power consumed by the displays of portable devices in order to improve the battery life of such devices.

Portable devices are used for numerous applications such as electronic mail, voice and data communications, word processing, mapping, navigation, computer games, etc. In general, these applications are launched by the system's operating system upon selection by a user from a menu or other graphical user interface ("GUI"). A GUI is used to convey information to and receive commands from users and generally includes a variety of GUI objects or controls, including icons, toolbars, drop-down menus, text, dialog boxes, buttons, and the like. A user typically interacts with a GUI by using a pointing device (e.g., a mouse) to position a pointer or cursor over an object and "clicking" on the object.

In addition to problems relating to limited battery life, another problem with these devices is the inability to effectively display detailed information for selected graphic objects when those objects are in the context of a larger image. A user may desire access to detailed information with respect to an object in order to closely examine the object, to interact with the object, or to interface with an external application or network through the object. For example, the detailed information may be a close-up view of the object or a region of a digital map image.

While an application may provide a GUI for a user to access and view detailed information for a selected object in a larger image, in doing so, the relative location of the object in the larger image may be lost to the user. Thus, while the user may have gained access to the detailed information required to interact with the object, the user may lose sight of the context within which that object is positioned in the larger image. This is especially so when the user interacts with the GUI using a computer mouse, keyboard, or keypad. The interaction may further distract the user from the context in which the detailed information is to be understood. This problem is an example of what is often referred to as the "screen real estate problem."

The screen real estate problem generally arises whenever large amounts of information are to be displayed on a display screen of limited size. Known tools to address this problem include panning and zooming. While these tools are suitable for a large number of visual display applications, they become less effective where sections of the visual information are spatially related, such as in layered maps and three-dimensional representations, for example. In this type of information display, panning and zooming are not as effective as much of the context of the panned or zoomed display may be hidden.

The screen real estate problem is most apparent in devices having small display screens. In particular, portable devices such as cellular telephones, PDAs, and GPS navigation devices typically present usability challenges in making device functions efficiently and easily accessible, due to limited-sized displays and other device limitations such as small keyboards or small active input surfaces (e.g., touchscreens) for user input. Such problems are compounded by the increasing functionality of modem wireless devices, wherein new capabilities such as cameras, music players, and video players are being incorporated into these devices, making these devices increasingly complex. The end result is that the user typically faces difficulties in efficiently gaining a desired access to a particular device feature, or to particular content, while maintaining awareness of how to access other device capabilities or content.

Additionally, in computer graphics systems users often wish to exclude portions of an image presented to them on a display screen. This operation is called "cropping." To perform a cropping operation or crop, a user typically selects two points to define a rectangle (e.g. top left and bottom right corners) enclosing a selected portion of the original image. The portion of the original image outside of the rectangle is then excluded or cropped and an image of the selected portion alone, that is, a cropped image, is presented to the user. One problem with conventional cropping methods is that a user may have difficulty selecting a desirable cropped image.

SUMMARY

Accordingly, there is provided a method for cropping a computer generated original image on a display, comprising: adjusting a user-selected movable boundary on the original image to define a cropped image within the boundary, the boundary defined by two or more points on the original image; and, distorting the original image in regions surrounding the points.

Distorting may further include creating a lens surface for one or more of the regions; and, transforming the original image by applying a distortion function defining the lens surface to the original image.

Creating may further include displaying a GUI over one or more of the regions for adjusting the lens surface.

The lens surface may include a focal region and a base region and the GUI includes: a slide bar icon for adjusting a magnification for the lens surface; a slide bar icon for adjusting a degree of scooping for the lens surface; a bounding rectangle icon with at least one handle icon for adjusting a size and a shape for the focal region; a bounding rectangle icon with at least one handle icon for adjusting a size and a shape for the base region; a move icon for adjusting a location for the lens surface on the boundary; a pickup icon for adjusting a location for the base region within the original image; and, a fold icon for adjusting a location for the focal region relative to the base region.

Adjusting may be performed by moving a cursor on the display with a pointing device, the cursor is an icon, the pointing device is a mouse, and the movable boundary is a polygon.

The original image may have one or more layers, the regions have a predetermined selection of these layers, and the cropped image has a predetermined selection of these layers.

By using detail-in-context lenses to select points defining an area for a cropped image, a user can view a large area (e.g., outside the lenses) while focusing in on smaller areas (e.g., inside the focal regions of the lenses) surrounding the selected points. This may make it possible for a user to perform accurate cropping without losing visibility or context of the portion of the original image surrounding the cropped area.

According to another embodiment, there is provided a method for measuring within a computer generated original image on a display, comprising the steps of: adjusting a user-selected movable line segment on the original image to define points on the original image for measuring between; and, distorting the original image in regions surrounding the points, whereby the points are accurately positioned for measuring.

Distorting may further include creating a lens surface for one or more of the regions; and, transforming the original image by applying a distortion function defining the lens surface to the original image.

Creating may further include displaying a GUI over one or more of the regions for adjusting the lens surface.

The lens surface may include a focal region and a base region and the GUI include: a slide bar icon for adjusting a magnification for the lens surface; a slide bar icon for adjusting a degree of scooping for the lens surface; a bounding rectangle icon with at least one handle icon for adjusting a size and a shape for the focal region; a bounding rectangle icon with at least one handle icon for adjusting a size and a shape for the base region; a move icon for adjusting a location for the lens surface on the boundary; a pickup icon for adjusting a location for the base region within the original image; and, a fold icon for adjusting a location for the focal region relative to the base region.

The adjusting may be performed by moving a cursor on the display with a pointing device, the cursor is an icon, the pointing device is a mouse, and the line segment is a straight line.

By using detail-in-context lenses to select points for measuring between, a user may view a large area (e.g., outside the lenses) while focusing in on smaller areas (e.g., inside the focal regions of the lenses) surrounding the selected points.

According to one embodiment, there is provided a method for generating and adjusting detailed views of selected information within the context of surrounding information presented on a display screen while reducing the power consumed by the display screen.

In accordance with further embodiments there is provided an apparatus such as a data processing system or portable device, a method for adapting this system or device, as well as articles of manufacture such as a computer readable medium having program instructions recorded thereon for practicing the method.

BRIEF DESCRIPTION OF THE DRAWINGS

Embodiments may be understood by referring to the following description and accompanying drawings. In the description and drawings, like numerals refer to like structures or processes. In the drawings.

DETAILED DESCRIPTION

Figure 1:
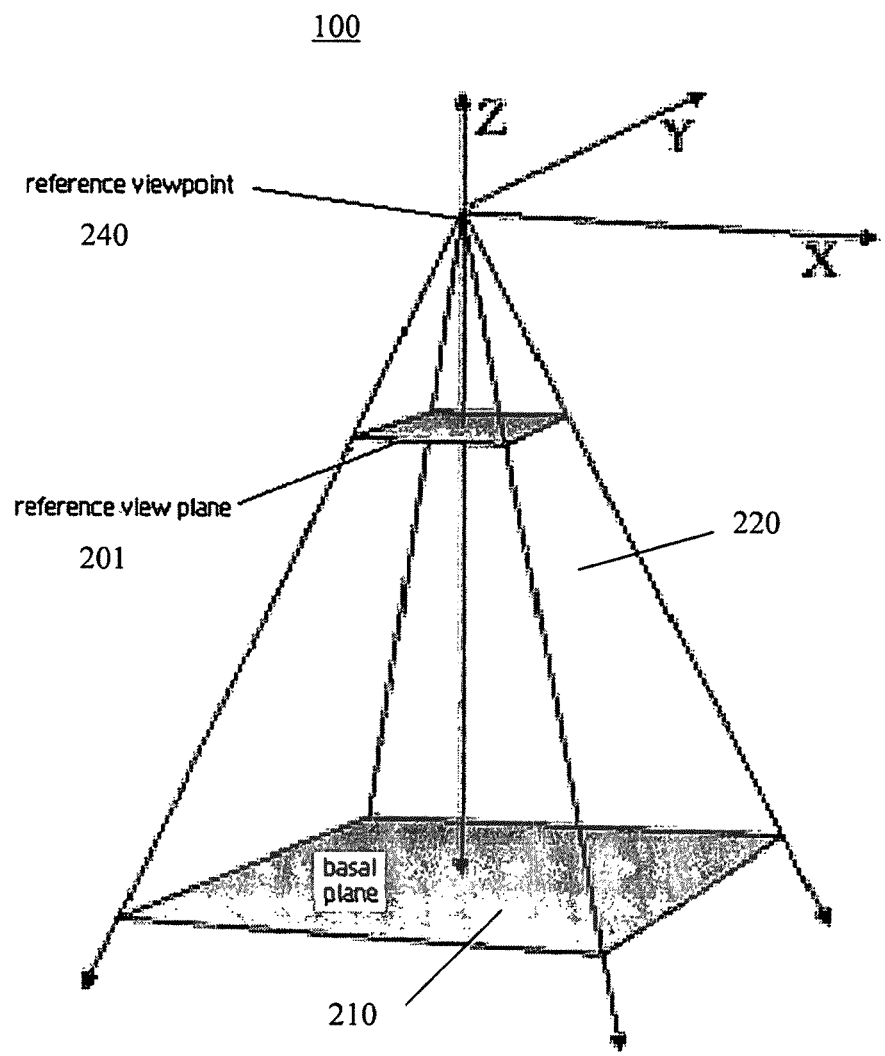
FIG. 1 is a graphical representation of the geometry for constructing a three-dimensional (3D) perspective viewing frustum, relative to an x, y, z coordinate system, in accordance with elastic presentation space graphics technology.

In the following description, numerous details are set forth to provide an understanding of the techniques described herein. However, it is understood that the techniques may be practiced without these specific details. The term "data processing system" is used herein to refer to any machine for processing data, including the computer systems and network arrangements described herein.

The "screen real estate problem" mentioned previously generally arises whenever large amounts of information are to be displayed on a display screen of limited size. Conventional tools to address this problem include panning and zooming. While these tools are suitable for a large number of visual display applications, these tools become less effective where sections of the visual information are spatially related, such as in maps, three-dimensional representations, and newspapers, for example. In this type of information display, panning and zooming are not as effective as much of the context of the panned or zoomed display may be hidden.

A recent solution to this problem is the application of "detail-in-context" presentation techniques. Detail-in-context is the magnification of a particular region-of-interest (the "focal region" or "detail") in a data presentation while preserving visibility of the surrounding information (the "context"). This technique has applicability to the display of large surface area media (e.g. digital maps) on computer screens of variable size including graphics workstations, laptop computers, personal digital assistants ("PDAs"), and cell phones.

In the detail-in-context discourse, differentiation is often made between the terms "representation" and "presentation." A representation is a formal system, or mapping, for specifying raw information or data that is stored in a computer or data processing system. For example, a digital map of a city is a representation of raw data including street names and the relative geographic location of streets and utilities. Such a representation may be displayed visually on a computer screen or printed on paper. On the other hand, a presentation is a spatial organization of a given representation that is appropriate for the task at hand. Thus, a presentation of a representation organizes such things as the point of view and the relative emphasis of different parts or regions of the representation. For example, a digital map of a city may be presented with a region magnified to reveal street names.

In general, a detail-in-context presentation may be considered as a distorted view (or distortion) of a portion of the original representation where the distortion is the result of the application of a "lens" like distortion function to the original representation. A detailed review of various detail-in-context presentation techniques such as "Elastic Presentation Space" ("EPS") (or "Pliable Display Technology" ("PDT")) may be found in a publication by Marianne S. T. Carpendale, entitled "A Framework for Elastic Presentation Space" (Carpendale, Marianne S. T., A Framework for Elastic Presentation Space (Burnaby, British Columbia: Simon Fraser University, 1999)), and incorporated herein by reference.

In general, detail-in-context data presentations are characterized by magnification of areas of an image where detail is desired, in combination with compression of a restricted range of areas of the remaining information (i.e., the context), the result typically giving the appearance of a lens having been applied to the display surface. Using the techniques, points in a representation are displaced in three dimensions and a perspective projection is used to display the points on a two-dimensional presentation display. Thus, when a lens is applied to a two-dimensional continuous surface representation, for example, the resulting presentation appears to be three-dimensional. In other words, the lens transformation appears to have stretched the continuous surface in a third dimension. In EPS graphics technology, a two-dimensional visual representation is placed onto a surface; this surface is placed in three-dimensional space; the surface, containing the representation, is viewed through perspective projection; and the surface is manipulated to effect the reorganization of image details. The presentation transformation is separated into two steps: surface manipulation or distortion and perspective projection.

FIG. 1 is a graphical representation 100 of the geometry for constructing a three-dimensional ("3D") perspective viewing frustum 220, relative to an x, y, z coordinate system, in accordance with elastic presentation space (EPS) graphics technology. In EPS technology, detail-in-context views of two-dimensional ("2D") visual representations are created with sight-line aligned distortions of a 2D information presentation surface within a 3D perspective viewing frustum 220. In EPS, magnification of regions of interest and the accompanying compression of the contextual region to accommodate this change in scale are produced by the movement of regions of the surface towards the viewpoint ("VP") 240 located at the apex of the pyramidal shape 220 containing the frustum. The process of projecting these transformed layouts via a perspective projection results in a new 2D layout which includes the zoomed and compressed regions. The use of the third dimension and perspective distortion to provide magnification in EPS provides a meaningful metaphor for the process of distorting the information presentation surface. The 3D manipulation of the information presentation surface in such a system is an intermediate step in the process of creating a new 2D layout of the information.

Figure 2:
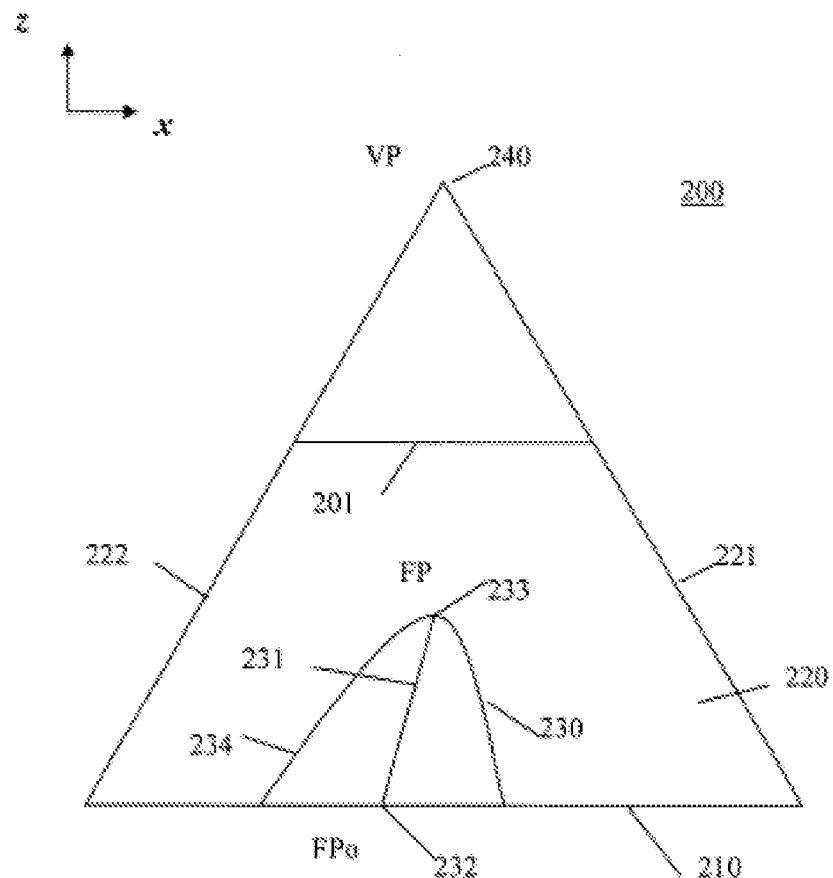
FIG. 2 is a graphical representation of the geometry of a presentation in accordance with elastic presentation space graphics technology.

FIG. 2 is a graphical representation 200 of the geometry of a presentation in accordance with EPS graphics technology. EPS graphics technology employs viewer-aligned perspective projections to produce detail-in-context presentations in a reference view plane 201 which may be viewed on a display. Undistorted 2D data points are located in a basal plane 210 of a 3D perspective viewing volume or frustum 220 which is defined by extreme rays 221 and 222 and the basal plane 210. The VP 240 is generally located above the centre point of the basal plane 210 and reference view plane ("RVP") 201. Points in the basal plane 210 are displaced upward onto a distorted surface 230 which is defined by a general 3D distortion function (i.e. a detail-in-context distortion basis function). The direction of the viewer-aligned perspective projection corresponding to the distorted surface 230 is indicated by the line FPo-FP 231 drawn from a point FPo 232 in the basal plane 210 through the point FP 233 which corresponds to the focus or focal region or focal point of the distorted surface 230.

EPS is applicable to multidimensional data and is suited to implementation on a computer for dynamic detail-in-context display on an electronic display surface such as a monitor. In the case of two dimensional data, EPS is typically characterized by magnification of areas of an image where detail is desired 233, in combination with compression of a restricted range of areas of the remaining information (i.e. the context) 234, the end result typically giving the appearance of a lens 230 having been applied to the display surface. The areas of the lens 230 where compression occurs may be referred to as the "shoulder" 234 of the lens 230. The area of the representation transformed by the lens may be referred to as the "lensed area." The lensed area thus includes the focal region and the shoulder. To reiterate, the source image or representation to be viewed is located in the basal plane 210. Magnification 233 and compression 234 are achieved through elevating elements of the source image relative to the basal plane 210, and then projecting the resultant distorted surface onto the reference view plane 201. EPS performs detail-in-context presentation of n-dimensional data through the use of a procedure wherein the data is mapped into a region in an (n+1) dimensional space, manipulated through perspective projections in the (n+1) dimensional space, and then finally transformed back into n-dimensional space for presentation. EPS has numerous advantages over conventional zoom, pan, and scroll technologies, including the capability of preserving the visibility of information outside 234 the local region of interest 233.

For example, and referring to FIGS. 1 and 2, in two dimensions, EPS can be implemented through the projection of an image onto a reference plane 201 in the following manner. The source image or representation is located on a basal plane 210, and those regions of interest 233 of the image for which magnification is desired are elevated so as to move them closer to a reference plane situated between the reference viewpoint 240 and the reference view plane 201. Magnification of the focal region 233 closest to the RVP 201 varies inversely with distance from the RVP 201. As shown in FIGS. 1 and 2, compression of regions 234 outside the focal region 233 is a function of both distance from the RVP 201, and the gradient of the function describing the vertical distance from the RVP 201 with respect to horizontal distance from the focal region 233. The resultant combination of magnification 233 and compression 234 of the image as seen from the reference viewpoint 240 results in a lens-like effect similar to that of a magnifying glass applied to the image. Hence, the various functions used to vary the magnification and compression of the source image via vertical displacement from the basal plane 210 are described as lenses, lens types, or lens functions. Lens functions that describe basic lens types with point and circular focal regions, as well as certain more complex lenses and advanced capabilities such as folding, examples of which are described by Carpendale.

System.

Figure 3:
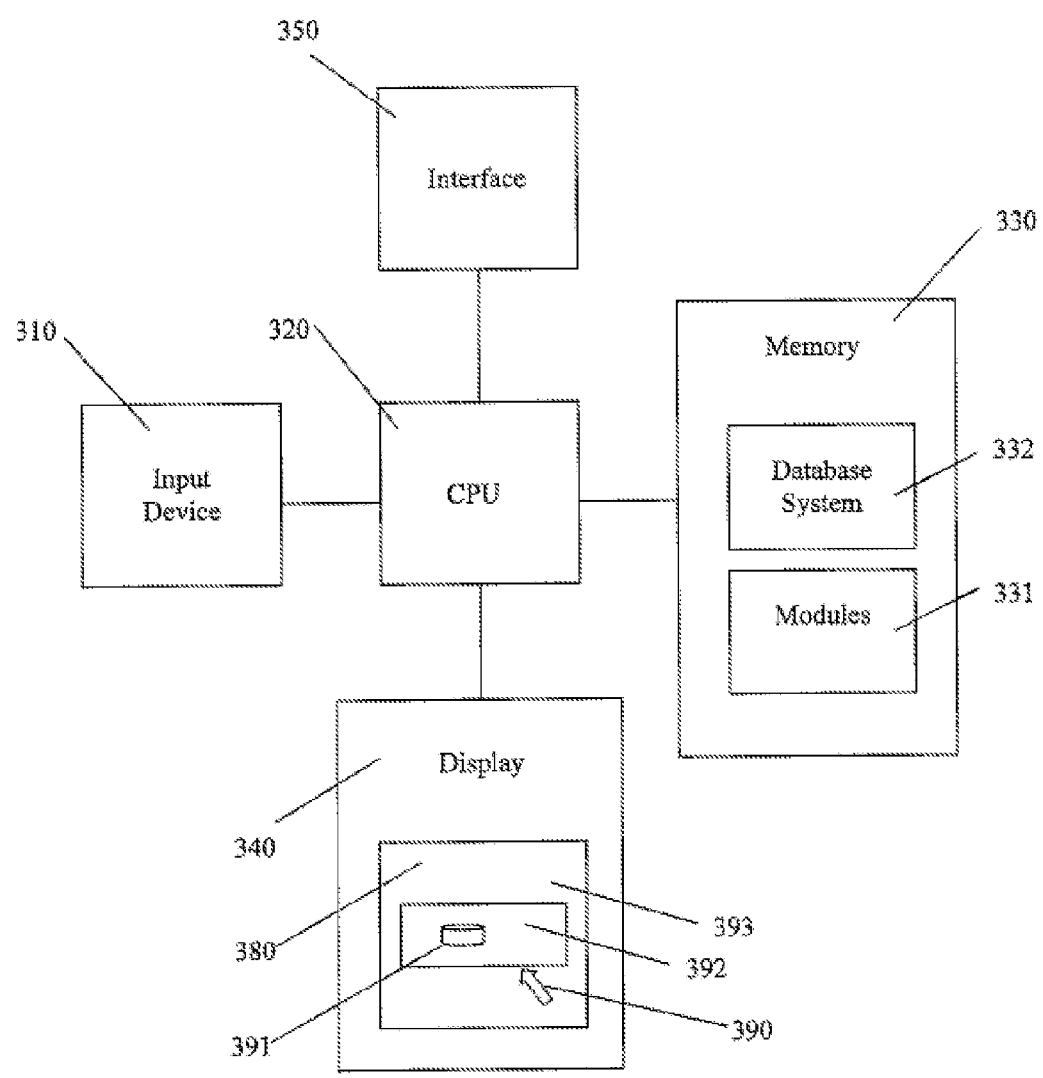
FIG. 3 is a block diagram illustrating a data processing system adapted for implementing an embodiment.

FIG. 3 is a block diagram of a data processing system 300 adapted to implement an embodiment. The data processing system is suitable for implementing EPS technology, for displaying detail-in-context presentations of representations, and for cropping representations in conjunction with a detail-in-context graphical user interface ("GUI") 400, as described below. The data processing system 300 includes an input device 310, a central processing unit or CPU 320, memory 330, a display 340, and an interface 350. The input device 310 may include a keyboard, mouse, trackball, or similar device. The CPU 320 may include dedicated coprocessors and memory devices. The memory 330 may include RAM, ROM, databases, or disk devices. And, the display 340 may include a computer screen, terminal device, or a hardcopy producing output device such as a printer or plotter. The data processing system 300 has stored therein data representing sequences of instructions which when executed cause the method described herein to be performed. Of course, the data processing system 300 may contain additional software and hardware.

The interface device 350 may include one or more network connections. The data processing system 300 may be adapted for communicating with other data processing systems (not shown) over a network (not shown) via the interface device 350. For example, the interface device 350 may include an interface to a network such as the Internet and/or another wired or wireless network. The interface device 350 may include transmitters, receivers, and antennae for interfacing with wireless networks. Thus, the data processing system 300 may be linked to other data processing systems by the network.

The CPU 320 may include dedicated coprocessors and memory devices. The CPU 320 is operatively coupled to the memory 330 which stores an operating system (e.g., as one or more of the modules 331) for general management of the system 300. The CPU 320 is operatively coupled to the input device 310 for receiving user commands or queries and for displaying the results of these commands or queries to the user on the display 340. Commands and queries may also be received via the interface device 350 and results may be transmitted via the interface device 350. The data processing system 300 may include a database system 332 for storing data and programming information. The database system 332 may include a database management system and a database and may be stored in the memory 330 of the data processing system 300. In general, the data processing system 300 has stored therein data representing sequences of instructions which when executed cause the method described herein to be performed. Of course, the data processing system 300 may contain additional software and hardware.

Thus, the data processing system 300 includes computer executable programmed instructions for directing the system 300 to implement the techniques described herein. The programmed instructions may be embodied in one or more hardware modules or software modules 331 resident in the memory 330 of the data processing system 300 or elsewhere. Alternatively, the programmed instructions may be embodied on a tangible computer readable storage medium (e.g., a compact disk ("CD"), a floppy disk, etc.) which may be used for transporting the programmed instructions to the memory 330 of the data processing system 300. Alternatively, the programmed instructions may be embedded in a computer-readable signal or signal-bearing medium that is uploaded to a network by a vendor or supplier of the programmed instructions, and this signal or signal-bearing medium may be downloaded through an interface (e.g., 350) to the data processing system 300 from the network by end users or potential buyers.

A user may interact with the data processing system 300 and its hardware and software modules 331 using a graphical user interface ("GUI") 380. The GUI 380 may be used for monitoring, managing, and accessing the data processing system 300. GUIs may be supported by an operating system and provide a display format which enables a user to choose commands, execute application programs, manage computer files, and perform other functions by selecting pictorial representations known as icons, or items from a menu through use of an input device 310 such as a mouse, thumbwheel, trackball, or keypad. In general, a GUI is used to convey information to and receive commands from users and generally includes a variety of GUI objects or controls, including icons, toolbars, drop-down menus, text, dialog boxes, buttons, and the like. A user typically interacts with a GUI 380 presented on a display 340 by using an input device (e.g., a mouse, thumbwheel, trackball, or keypad) 310 to position a pointer or cursor 390 over an object (e.g., an icon, a region-of-interest, etc.) 391 in an image (e.g., an original image, representation, etc.) 393 and by "clicking" on the object 391. Typically, a GUI based system presents application, system status, and other information to the user in one or more "windows" appearing on the display 340. A window 392 is a more or less rectangular area within the display 340 in which a user may view an application or a document. Such a window 392 may be open, closed, displayed full screen, reduced to an icon, increased or reduced in size, or moved to different areas of the display 340. Multiple windows may be displayed simultaneously, such as: windows included within other windows, windows overlapping other windows, or windows tiled within the display area.

As mentioned above, the screen real estate problem is most apparent in portable devices 300 having small display screens 340. In particular, portable devices 300 such as cellular phones, PDAs, and GPS navigation devices typically present usability challenges in making device functions efficient and accessible, due to limited-sized displays 340 and other device limitations such as small keyboards 310 or small active input surfaces (e.g., touch screens) 310 for user input. Such problems may be compounded by the increasing functionality of modern portable devices 300, wherein new capabilities such as cameras, music players, and video players are being incorporated into these devices, making these devices increasingly complex. The end result is that the user typically faces difficulties in efficiently gaining a desired access to a particular device feature, or to particular content, while maintaining awareness of how to access other device capabilities or content using conventional techniques.

For reference, the term "detail-in-context" refers to the magnification of a particular region-of-interest (the "detail") in an original image while preserving visibility of the surrounding information (the "context"). A presentation including a detail-in-context lens area (or inset magnifier) may be referred to as a detail-in-context presentation. In general, a detail-in-context presentation may be considered as a distorted view of a portion of an original image (i.e., about the region-of-interest) where the distortion is the result of the application of a "lens" like distortion function to the original image (or the application of an inset magnifier to the original image). Detail-in-context presentations may be generated using a variety of the methods. A detailed review of various detail-in-context presentation methods may be found in a publication by Marianne S. T. Carpendale, entitled "A Framework for Elastic Presentation Space" (Carpendale, Marianne S. T., A Framework for Elastic Presentation Space (Burnaby, British Columbia: Simon Fraser University, 1999)), and incorporated herein by reference.

According to one embodiment, a detail-in-context presentation may be generated by applying a lens to a region-of-interest in an original image as follows. First, the undistorted original image is located in a base plane of a three-dimensional perspective viewing volume or frustum. A viewpoint is typically located above a centre point of a view plane which is located above the base plane. Points of the original image in the base plane are displaced upward onto a distorted surface or lens which is defined by a three-dimensional distortion function (e.g., the lens may have a truncated pyramid shape having a flat rectangular top surrounded by four inclined trapezoidal sides). The displaced points are then projected (e.g., perspectively projected, etc.) onto the view plane to generate the presentation. The direction of the projection may be in the direction of a line constructed through a point in the base plane through a point in the focal region of the lens. The projection may be in a direction that is viewer-aligned (i.e., the point in the base plane, the point in the focal region, and the viewpoint are collinear). The resultant combination of magnification and compression of the original image as seen in the view plane from the viewpoint results in a lens-like effect similar to that of a magnifying glass applied to the original image. In general, the lens has a "focal region" (e.g., the flat rectangular top of a lens having a truncated pyramid shape) for the region-of-interest. The focal region has an elevation (or magnification) that produces a corresponding "magnified region" for the region-of-interest upon projection onto the view plane. At least partially surrounding the focal region is a "shoulder region" (e.g., the four inclined trapezoidal sides of a lens having a truncated pyramid shape) where the elevation (or magnification) decreases from that of the focal region to that of the original image surrounding the shoulder region and which produces a corresponding at least partially "compressed region" upon projection onto the view plane.

According to another embodiment, a detail-in-context presentation may be generated by applying an inset magnifier to an original image. An inset magnifier may be thought of as a lens without a shoulder region or as a lens with a vertical shoulder region. Of course, projection is optional to generate such presentations.

GUI with Lens Control Elements.

As mentioned, detail-in-context presentations of data using techniques such as pliable surfaces, as described by Carpendale, are useful in presenting large amounts of information on limited-size display surfaces. Detail-in-context views allow magnification of a particular region-of-interest (the "focal region") 233 in a data presentation while preserving visibility of the surrounding information 210. In the following, a GUI 400 is described having lens control elements that can be implemented in software and applied to the cropping and measurement of representations and to the control of detail-in-context data presentations. The software can be loaded into and run by the data processing system 300 of FIG. 3.

Figure 4:
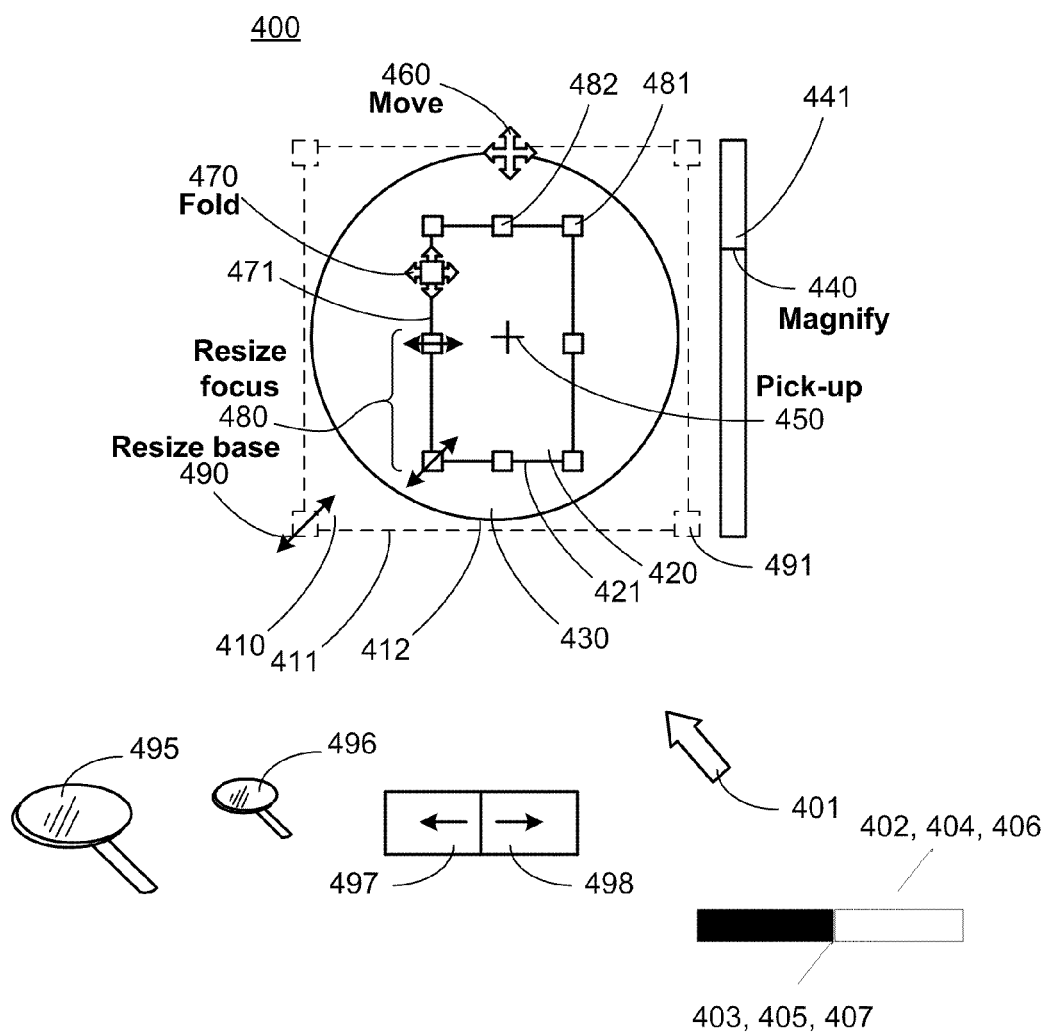
FIG. 4 a partial screen capture illustrating a GUI having lens control elements for user interaction with detail-in-context data presentations in accordance with an embodiment.

FIG. 4 is a partial screen capture illustrating a GUI 400 having lens control elements for user interaction with detail-in-context data presentations in accordance with an embodiment. Detail-in-context data presentations are characterized by magnification of areas of an image where detail is desired, in combination with compression of a restricted range of areas of the remaining information (i.e. the context), the end result typically giving the appearance of a lens having been applied to the display screen surface. The lens control elements of the GUI 400 may be adjusted by the user via an input device 310 to control the characteristics of the lens 410 (shown after projection in FIG. 4) used to generate the detail-in-context presentation. Using the input device 310 (e.g., a mouse), a user adjusts parameters of the lens 410 using icons and scroll bars of the GUI 400 that are displayed over the magnified and compressed regions 420, 430 on the display screen 340. Signals representing input device 310 movements and selections are transmitted to the CPU 320 of the data processing system 300 where they are translated into instructions for lens control. This lens 410 includes a "focal region"420 having high magnification, a surrounding "shoulder region" 430 where information is typically visibly compressed, and a "base" 412 surrounding the shoulder region 430 and defining the extent of the lens 410. In FIG. 4, the lens 410 is shown with a circular shaped base 412 (or outline) and with a focal region 420 lying near the center of the lens 410. However, the lens 410 and focal region 420 may have any desired shape. For example, in FIG. 5, the lenses 510, 511 have a pyramid shape with flat tops 520, 521 and trapezoidal shoulders 530, 531. As mentioned above, the base of the lens 412 may be coextensive with the focal region 420.

In general, the GUI 400 has lens control elements that, in combination, provide for the interactive control of the lens 410, 510, 511. The effective control of the characteristics of the lens 410 by a user (i.e. dynamic interaction with a detail-in-context lens) is advantageous. At any given time, one or more of these lens control elements may be made visible to the user on the display surface 340 by appearing as overlay icons on the lens 410. Interaction with each element is performed via the motion of an input or pointing device 310 (e.g. mouse), with the motion resulting in an appropriate change in the corresponding lens characteristic. As will be described, selection of which lens control element is actively controlled by the motion of the pointing device 310 at any given time is determined by the proximity of the icon representing the pointing device 310 (e.g. cursor) on the display surface 340 to the appropriate component of the lens 410. For example, "dragging" of the pointing device at the periphery of the bounding rectangle of the lens base 412 causes a corresponding change in the size of the lens 410 (i.e. "resizing"). Thus, the GUI 400 provides the user with a visual representation of which lens control element is being adjusted through the display of one or more corresponding icons.

For ease of understanding, the following discussion will be in the context of using a two-dimensional pointing device 310 that is a mouse, but it will be understood that the techniques may be practiced with other 2-D or 3-D (or even greater numbers of dimensions) pointing devices including a trackball and keyboard.

A mouse 310 controls the position of a cursor icon 401 that is displayed on the display screen 340. The cursor 401 is moved by moving the mouse 310 over a flat surface, such as the top of a desk, in the desired direction of movement of the cursor 401. Thus, the two-dimensional movement of the mouse 310 on the flat surface translates into a corresponding two-dimensional movement of the cursor 401 on the display screen 340.

A mouse 310 typically has one or more finger actuated control buttons (i.e. mouse buttons). While the mouse buttons can be used for different functions such as selecting a menu option pointed at by the cursor 401, a single mouse button may also be used to "select" a lens 410 and to trace the movement of the cursor 401 along a desired path. Specifically, to select a lens 410, the cursor 401 is first located within the extent of the lens 410. In other words, the cursor 401 is "pointed" at the lens 410. Next, the mouse button is depressed and released. That is, the mouse button is "clicked." Selection is thus a point and click operation. To trace the movement of the cursor 401, the cursor 401 is located at the desired starting location, the mouse button is depressed to signal the computer 320 to activate a lens control element, and the mouse 310 is moved while maintaining the button depressed. After the desired path has been traced, the mouse button is released. This procedure is often referred to as "clicking" and "dragging" (i.e. a click and drag operation). It will be understood that a predetermined key on a keyboard 310 could also be used to activate a mouse click or drag. In the following, the term "clicking" will refer to the depression of a mouse button indicating a selection by the user and the term "dragging" will refer to the subsequent motion of the mouse 310 and cursor 401 without the release of the mouse button.

The GUI 400 may include the following lens control elements: move, pickup, resize base, resize focus, fold, magnify, scoop, brightness, and contrast. Each of these lens control elements may have at least one lens control icon or alternate cursor icon associated with it. In general, when a lens 410 is selected by a user through a point and click operation, the following lens control icons may be displayed over the lens 410: pickup icon 450, base outline icon 412, base bounding rectangle icon 411, focal region bounding rectangle icon 421, handle icons 481, 482, 491, magnify slide bar icon 440, scoop slide bar icon 402, brightness slide bar icon 404, and contrast slide bar icon 406. Typically, these icons are displayed simultaneously after selection of the lens 410. In addition, when the cursor 401 is located within the extent of a selected lens 410, an alternate cursor icon 460, 470, 480, 490 may be displayed over the lens 410 to replace the cursor 401 or may be displayed in combination with the cursor 401. These lens control elements, corresponding icons, and their effects on the characteristics of a lens 410 are described below with reference to FIG. 4.

In general, when a lens 410 is selected by a point and click operation, bounding rectangle icons 411, 421 are displayed surrounding the base 412 and focal region 420 of the selected lens 410 to indicate that the lens 410 has been selected. With respect to the bounding rectangles 411, 421 one might view them as glass windows enclosing the lens base 412 and focal region 420, respectively. The bounding rectangles 411, 421 include handle icons 481, 482, 491 allowing for direct manipulation of the enclosed base 412 and focal region 420 as will be explained below. Thus, the bounding rectangles 411, 421 not only inform the user that the lens 410 has been selected, but also provide the user with indications as to what manipulation operations might be possible for the selected lens 410 though use of the displayed handles 481, 482, 491. A bounding region having a shape other than generally rectangular may also be provided, such a bounding region of any of a great number of shapes including oblong, oval, ovoid, conical, cubic, cylindrical, polyhedral, spherical, etc.

Moreover, the cursor 401 provides a visual cue indicating the nature of an available lens control element. As such, the cursor 401 will generally change in form by simply pointing to a different lens control icon 450, 412, 411, 421, 481, 482, 491, 440, 402. For example, when resizing the base 412 of a lens 410 using a corner handle 491, the cursor 401 will change form to a resize icon 490 once it is pointed at (i.e. positioned over) the corner handle 491. The cursor 401 will remain in the form of the resize icon 490 until the cursor 401 has been moved away from the corner handle 491.

Move

Lateral movement of a lens 410 is provided by the move lens control element of the GUI 400. This functionality is accomplished by the user first selecting the lens 410, 510, 511 through a point and click operation. Then, the user points to a point within the lens 410 that is other than a point lying on a lens control icon 450, 412, 411, 421, 481, 482, 491, 440, 540. When the cursor 401 is so located, a move icon 460 is displayed over the lens 410 to replace the cursor 401 or may be displayed in combination with the cursor 401. The move icon 460 not only informs the user that the lens 410 may be moved, but also provides the user with indications as to what movement operations are possible for the selected lens 410. For example, the move icon 460 may include arrowheads indicating up, down, left, and right motion. Next, the lens 410 is moved by a click and drag operation in which the user clicks and drags the lens 410 to the desired position on the screen 340 and then releases the mouse button 310. The lens 410 is locked in its new position until a further pickup and move operation is performed.

Pickup

Lateral movement of a lens 410 is also provided by the pickup lens control element of the GUI. This functionality is accomplished by the user first selecting the lens 410 through a point and click operation. As mentioned above, when the lens 410 is selected a pickup icon 450 is displayed over the lens 410 near the centre of the lens 410. Typically, the pickup icon 450 will be a crosshairs. In addition, a base outline 412 is displayed over the lens 410 representing the base 412 of the lens 410. The crosshairs 450 and lens outline 412 not only inform the user that the lens has been selected, but also provides the user with an indication as to the pickup operation that is possible for the selected lens 410. Next, the user points at the crosshairs 450 with the cursor 401. Then, the lens outline 412 is moved by a click and drag operation in which the user clicks and drags the crosshairs 450 to the desired position on the screen 340 and then releases the mouse button 310. The full lens 410 is then moved to the new position and is locked there until a further pickup operation is performed. In contrast to the move operation described above, with the pickup operation, it is the outline 412 of the lens 410 that the user repositions rather than the full lens 410.

Resize Base

Resizing of the base 412 (or outline) of a lens 410 is provided by the resize base lens control element of the GUI. After the lens 410 is selected, a bounding rectangle icon 411 is displayed surrounding the base 412. The bounding rectangle 411 includes handles 491. These handles 491 can be used to stretch the base 412 taller or shorter, wider or narrower, or proportionally larger or smaller. The corner handles 491 will keep the proportions the same while changing the size. The middle handles (not shown) will make the base 412 taller or shorter, wider or narrower. Resizing the base 412 by the corner handles 491 will keep the base 412 in proportion. Resizing the base 412 by the middle handles (not shown) will change the proportions of the base 412. That is, the middle handles (not shown) change the aspect ratio of the base 412 (i.e. the ratio between the height and the width of the bounding rectangle 411 of the base 412). When a user points at a handle 491 with the cursor 401 a resize icon 490 may be displayed over the handle 491 to replace the cursor 401 or may be displayed in combination with the cursor 401. The resize icon 490 not only informs the user that the handle 491 may be selected, but also provides the user with indications as to the resizing operations that are possible with the selected handle. For example, the resize icon 490 for a corner handle 491 may include arrows indicating proportional resizing. The resize icon (not shown) for a middle handle (not shown) may include arrows indicating width resizing or height resizing. After pointing at the desired handle 491, the user would click and drag the handle 491 until the desired shape and size for the base 412 is reached. Once the desired shape and size are reached, the user would release the mouse button 310. The base 412 of the lens 410 is then locked in its new size and shape until a further base resize operation is performed.

Resize Focus

Resizing of the focal region 420 of a lens 410 is provided by the resize focus lens control element of the GUI. After the lens 410 is selected, a bounding rectangle icon 421 is displayed surrounding the focal region 420. The bounding rectangle 421 includes handles 481, 482. These handles 481, 482 can be used to stretch the focal region 420 taller or shorter, wider or narrower, or proportionally larger or smaller. The corner handles 481 will keep the proportions the same while changing the size. The middle handles 482 will make the focal region 420 taller or shorter, wider or narrower. Resizing the focal region 420 by the corner handles 481 will keep the focal region 420 in proportion. Resizing the focal region 420 by the middle handles 482 will change the proportions of the focal region 420. That is, the middle handles 482 change the aspect ratio of the focal region 420 (i.e. the ratio between the height and the width of the bounding rectangle 421 of the focal region 420). When a user points at a handle 481, 482 with the cursor 401 a resize icon 480 may be displayed over the handle 481, 482 to replace the cursor 401 or may be displayed in combination with the cursor 401. The resize icon 480 not only informs the user that a handle 481, 482 may be selected, but also provides the user with indications as to the resizing operations that are possible with the selected handle. For example, the resize icon 480 for a corner handle 481 may include arrows indicating proportional resizing. The resize icon 480 for a middle handle 482 may include arrows indicating width resizing or height resizing. After pointing at the desired handle 481, 482, the user would click and drag the handle 481, 482 until the desired shape and size for the focal region 420 is reached. Once the desired shape and size are reached, the user would release the mouse button 310. The focal region 420 is then locked in its new size and shape until a further focus resize operation is performed.

Fold

Folding of the focal region 420 of a lens 410 is provided by the fold control element of the GUI. In general, control of the degree and direction of folding (i.e. skewing of the viewer aligned vector 231 as described by Carpendale) is accomplished by a click and drag operation on a point 471, other than a handle 481, 482, on the bounding rectangle 421 surrounding the focal region 420. The direction of folding is determined by the direction in which the point 471 is dragged. The degree of folding is determined by the magnitude of the translation of the cursor 401 during the drag. In general, the direction and degree of folding corresponds to the relative displacement of the focus 420 with respect to the lens base 410. In other words, and referring to FIG. 2, the direction and degree of folding corresponds to the displacement of the point FP 233 relative to the point FPo 232, where the vector joining the points FPo 232 and FP 233 defines the viewer aligned vector 231. In particular, after the lens 410 is selected, a bounding rectangle icon 421 is displayed surrounding the focal region 420. The bounding rectangle 421 includes handles 481, 482. When a user points at a point 471, other than a handle 481, 482, on the bounding rectangle 421 surrounding the focal region 420 with the cursor 401, a fold icon 470 may be displayed over the point 471 to replace the cursor 401 or may be displayed in combination with the cursor 401. The fold icon 470 not only informs the user that a point 471 on the bounding rectangle 421 may be selected, but also provides the user with indications as to what fold operations are possible. For example, the fold icon 470 may include arrowheads indicating up, down, left, and right motion. By choosing a point 471, other than a handle 481, 482, on the bounding rectangle 421 a user may control the degree and direction of folding. To control the direction of folding, the user would click on the point 471 and drag in the desired direction of folding. To control the degree of folding, the user would drag to a greater or lesser degree in the desired direction of folding. Once the desired direction and degree of folding is reached, the user would release the mouse button 310. The lens 410 is then locked with the selected fold until a further fold operation is performed.

Magnify

Magnification of the lens 410 is provided by the magnify lens control element of the GUI. After the lens 410 is selected, the magnify control is presented to the user as a slide bar icon 440 near or adjacent to the lens 410 and typically to one side of the lens 410. Sliding the bar 441 of the slide bar 440 results in a proportional change in the magnification of the lens 410. The slide bar 440 not only informs the user that magnification of the lens 410 may be selected, but also provides the user with an indication as to what level of magnification is possible. The slide bar 440 includes a bar 441 that may be slid up and down, or left and right, to adjust and indicate the level of magnification. To control the level of magnification, the user would click on the bar 441 of the slide bar 440 and drag in the direction of desired magnification level. Once the desired level of magnification is reached, the user would release the mouse button 310. The lens 410 is then locked with the selected magnification until a further magnification operation is performed. In general, the focal region 420 is an area of the lens 410 having constant magnification (i.e. if the focal region is a plane). Again referring to FIGS. 1 and 2, magnification of the focal region 420, 233 varies inversely with the distance from the focal region 420, 233 to the reference view plane (RVP) 201. Magnification of areas lying in the shoulder region 430 of the lens 410 also varies inversely with their distance from the RVP 201. Thus, magnification of areas lying in the shoulder region 430 will range from unity at the base 412 to the level of magnification of the focal region 420.

Zoom

Zoom functionality is provided by the zoom lens control element of the GUI. The zoom lens control element allows a user to quickly navigate to a region-of-interest within an original image and then zoom in to that region-of-interest for detailed viewing or editing. The combined presentation area covered by the focal region 420 and shoulder region 430 may be referred to as the "extent of the lens". Similarly, the presentation area covered by the focal region 420 may be referred to as the "extent of the focal region". The extent of the lens may be indicated to a user by a shoulder region bounding rectangle 411 when the lens 410 is selected. The extent of the lens may also be indicated by an arbitrarily shaped figure that bounds or is coincident with the perimeter (e.g., 412) of the shoulder region 430. Similarly, the extent of the focal region may be indicated by a focal region bounding rectangle 421 or arbitrarily shaped figure. The zoom lens control element allows a user to: (a) "zoom in" to the extent of the focal region such that the extent of the focal region fills the display screen 340 (i.e., "zoom to focal region extent"); (b) "zoom in" to the extent of the lens such that the extent of the lens fills the display screen 340 (i.e., "zoom to lens extent"); or, (c) "zoom in" to the area lying outside of the extent of the focal region such that the area without the focal region is magnified to the same level as the extent of the focal region (i.e., "zoom to scale").

In particular, after the lens 410 is selected, a bounding rectangle icon 411 is displayed surrounding the shoulder region 430 and a bounding rectangle icon 421 is displayed surrounding the focal region 420. Zoom functionality is accomplished by the user first selecting the zoom icon 495 through a point and click operation When a user selects zoom functionality, a zoom cursor icon 496 may be displayed to replace the cursor 401 or may be displayed in combination with the cursor 401. The zoom cursor icon 496 provides the user with indications as to what zoom operations are possible. For example, the zoom cursor icon 496 may include a magnifying glass. By choosing a point within the extent of the focal region, within the extent of the lens, or without the extent of the lens, the user may control the zoom function.

To zoom in to the extent of the focal region such that the extent of the focal region fills the display screen 340 (i.e., "zoom to focal region extent"), the user may point and click within the extent of the focal region. To zoom in to the extent of the lens such that the extent of the lens fills the display screen 340 (i.e., "zoom to lens extent"), the user may point and click within the extent of the lens. Or, to zoom in to the presentation area without the extent of the focal region, such that the area without the extent of the focal region is magnified to the same level as the extent of the focal region (i.e., "zoom to scale"), the user may point and click without the extent of the lens. After the point and click operation is complete, the presentation is locked with the selected zoom until a further zoom operation is performed.

Alternatively, rather than choosing a point within the extent of the focal region, within the extent of the lens, or without the extent of the lens to select the zoom function, a zoom function menu with multiple items (not shown) or multiple zoom function icons (not shown) may be used for zoom function selection. The zoom function menu may be presented as a pull-down menu. The zoom function icons may be presented in a toolbar or adjacent to the lens 410 when the lens is selected. Individual zoom function menu items or zoom function icons may be provided for each of the "zoom to focal region extent", "zoom to lens extent", and "zoom to scale" functions described above. In this alternative, after the lens 410 is selected, a bounding rectangle icon 411 may be displayed surrounding the shoulder region 430 and a bounding rectangle icon 421 may be displayed surrounding the focal region 420. Zoom functionality is accomplished by the user selecting a zoom function from the zoom function menu or via the zoom function icons using a point and click operation. In this way, a zoom function may be selected without considering the position of the cursor 401 within the lens 410.

Scoop

The concavity or "scoop" of the shoulder region 430 of the lens 410 is provided by the scoop lens control element of the GUI. After the lens 410 is selected, the scoop control is presented to the user as a slide bar icon 402 near or adjacent to the lens 410 and typically below the lens 410. Sliding the bar 403 of the slide bar icon 402 results in a proportional change in the concavity or scoop of the shoulder region 430 of the lens 410. The slide bar icon 402 not only informs the user that the shape of the shoulder region 430 of the lens 410 may be selected, but also provides the user with an indication as to what degree of shaping is possible. The slide bar icon 402 includes a bar 403 that may be slid left and right, or up and down, to adjust and indicate the degree of scooping. To control the degree of scooping, the user would click on the bar 403 of the slide bar icon 402 and drag in the direction of desired scooping degree. Once the desired degree of scooping is reached, the user would release the mouse button 310. The lens 410 is then locked with the selected scoop until a further scooping operation is performed.

Brightness

Brightness of the lens 410 is provided by the brightness lens control element of the GUI. After the lens 410 is selected, the brightness control is presented to the user as a slide bar icon 404 near or adjacent to the lens 410 and typically to one side of the lens 410. Sliding the bar 405 of the slide bar icon 404 results in a proportional change in the brightness of the lens 410. The slide bar 405 not only informs the user that brightness of the lens 410 may be selected, but also provides the user with an indication as to what level of brightness is possible.

Thus, the slide bar icon 404 includes a bar 405 that may be slid up and down, or left and right, to adjust and indicate the level of brightness. To control the level of brightness, the user would click on the bar 405 of the slide bar icon 402 and drag in the direction of desired brightness level. Once the desired level of brightness is reached, the user would release the mouse button 310. The lens 410 is then locked with the selected brightness until a further brightness operation is performed. In general, the focal region 420 is an area of the lens 410 having constant brightness (e.g., for a focal region 420 that is the flat rectangular top of a lens having a truncated pyramid shape).

Brightness of the focal region 420 may vary inversely with the distance from the focal region 420 to the view plane. Brightness of areas lying in the shoulder region 430 of the lens 410 may also vary inversely with their distance from the view plane. Thus, brightness of areas lying in the shoulder region 430 will range from a base level at the perimeter (e.g., 412) of the shoulder region 430 to the level of brightness of the focal region 420 (e.g., for a shoulder region 430 that comprises the four inclined trapezoidal sides of a lens having a truncated pyramid shape).

Contrast

Contrast of the lens 410 is provided by the contrast lens control element of the GUI. After the lens 410 is selected, the contrast control is presented to the user as a slide bar icon 406 near or adjacent to the lens 410 and typically to one side of the lens 410. Sliding the bar 407 of the slide bar icon 406 results in a proportional change in the contrast of the lens 410. The slide bar 407 not only informs the user that contrast of the lens 410 may be selected, but also provides the user with an indication as to what level of contrast is possible.

Thus, as illustrated the slide bar icon 406 includes a bar 407 that may be slid up and down, or left and right, to adjust and indicate the level of contrast. To control the level of contrast, the user would click on the bar 407 of the slide bar icon 406 and drag in the direction of desired contrast level. Once the desired level of contrast is reached, the user would release the mouse button 310. The lens 410 is then locked with the selected contrast until a further contrast operation is performed. In general, the focal region 420 is an area of the lens 410 having constant contrast (e.g., for a focal region 420 that is the flat rectangular top of a lens having a truncated pyramid shape). Contrast of the focal region 420 may vary inversely with the distance from the focal region 420 to the view plane. Contrast of areas lying in the shoulder region 430 of the lens 410 may also vary inversely with their distance from the view plane. Thus, contrast of areas lying in the shoulder region 430 will range from a base level at the perimeter (e.g., 412) of the shoulder region 430 to the level of contrast of the focal region 420 (e.g., for a shoulder region 430 that comprises the four inclined trapezoidal sides of a lens having a truncated pyramid shape).

Icon Hiding

Figure 5:
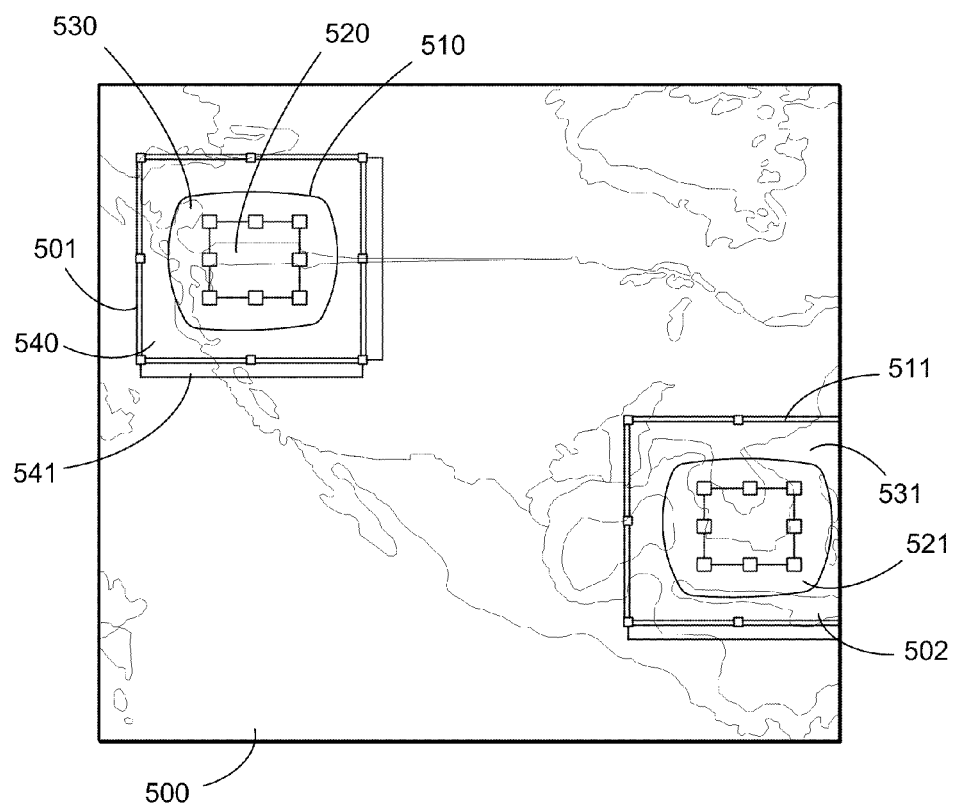
FIG. 5 is a screen capture illustrating a presentation having two detail-in-context lenses and associated GUIs for defining the corners of a bounding rectangle GUI for cropping an original digital image or representation in accordance with an embodiment.

A user may choose to hide one or more lens control icons 450, 412, 411, 421, 481, 482, 491, 440, 540 shown in FIGS. 4 and 5 from view so as not to impede the user's view of the image within the lens 410. This may be helpful, for example, during a move operation. A user may select this option through a variety of different ways, such as a menu or lens property dialog box.

Cropping with Multiple Detail-In-Context Lenses

The following discussion pertains to detail-in-context data viewing techniques that are applied to the cropping and measurement of digital image presentations. Detail-in-context data viewing techniques allow a user to view multiple levels of detail or resolution on one display 340. The appearance of the data display or presentation is that of one or more virtual lens showing detail 233 within the context of a larger area view 210. Using multiple lenses in detail-in-context data presentations may be used to compare two regions of interest at the same time. Folding enhances this comparison by allowing the user to pull the regions of interest closer together. In accordance with the present techniques, multiple detail-in-context lenses may be used to accurately crop digital images.

FIG. 5 is a screen capture illustrating a presentation 500 having two detail-in-context lenses 510, 511 and associated GUIs 501, 502 for defining the corners of a bounding rectangle GUI for cropping an original digital image or representation in accordance with an embodiment. In FIG. 5, the original image to be cropped is a map of North America. In order to produce a cropped image showing that portion of the United States from Washington State to Florida, for example, a user defines a first lens 510 over Washington State using a first GUI and a second lens 511 over Florida using a second GUI 502. The lenses 510, may be introduced to the original image to form the illustrated presentation through the use of a pull-down menu selection, tool bar icon, etc. The lenses 510, are positioned at what will be the top left and bottom right corners of a bounding rectangle that will be used to define the cropped image. Using lens control elements for each GUI 501, 502, such as move, pickup, resize base, resize focus, fold, and magnify as described above, the user adjusts each lens 510, 511 to accurately select a point or corner for the creation of a bounding rectangle for cropping. Each selected point may be indicated on in the presentation with a crosshairs icon 450, for example. Using the magnify lens control element, for example, the user may magnify the focal region 520, 521 of each lens 510, 511 to pixel quality resolution making it easy to view, for example, the point where the boarders of Washington State and Canada meet in the first lens 510 and the point where land ends at the coast of Florida in the second lens 511.

Figure 6:
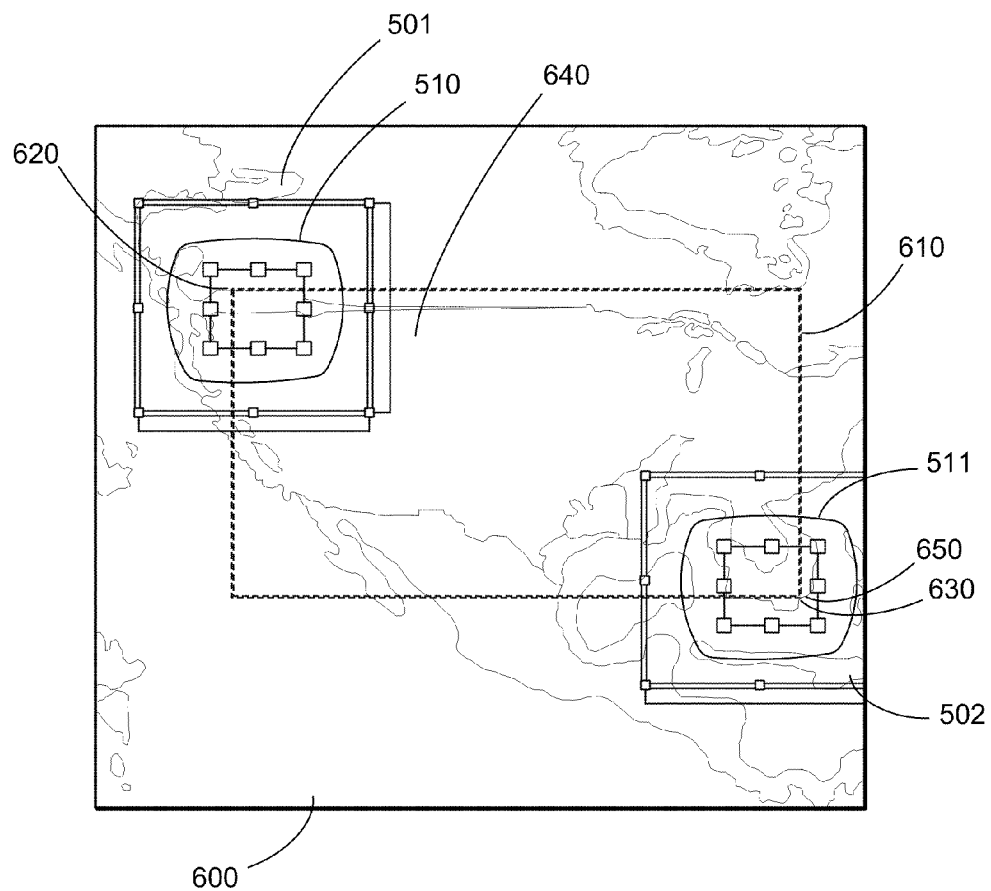
FIG. 6 is a screen capture illustrating a presentation having detail-in-context lenses, associated GUIs, and a bounding rectangle GUI or icon for cropping an original digital image or representation to produce a cropped image in accordance with an embodiment.

FIG. 6 is a screen capture illustrating a presentation 600 having detail-in-context lenses 510, 511, associated GUIs 501, 502, and a bounding rectangle GUI or icon 610 for cropping an original digital image or representation to produce a cropped image 640 in accordance with an embodiment. Once the lenses 510, 511 are in place, the user may use an existing tool to crop the presentation 600 to produce a cropped image 640. In FIG. 6, the user has defined an area with a bounding rectangle GUI 610. The bounding rectangle GUI 610, defining an area for the cropped image 640, may also be displaced or distorted by the lenses 510, 511, however, in FIG. 6, this is not shown. The resultant cropped image 640 may be presented with or without lens distortions 510, 511.

In operation, the data processing system 300 employs EPS techniques with an input device 310 and GUIs 501, 502, 610 for selecting points 620, 630 to define a cropped image 640 for display to a user on a display screen 340. Data representing an original image or representation is received by the CPU 320 of the data processing system 300. Using EPS techniques, the CPU 320 processes the data in accordance with instructions received from the user via an input device 310 and GUIs 501, 502 to produce a detail-in-context presentation 500. The presentation 500 is presented to the user on a display screen 340. It will be understood that the CPU 320 may apply a transformation to the shoulder regions 530, 531 surrounding the regions-of-interest 520, 521 to affect blending or folding in accordance with EPS technology. For example, the transformation may map the regions-of-interest 520, 521 and/or shoulder regions 530, 531 to a predefined lens surface, defined by a transformation or distortion function and having a variety of shapes, using EPS techniques. Or, the lens 510, 511 may be simply coextensive with the regions-of-interest 520, 521. Blending and folding of lenses in detail-in-context presentations are described in United States Patent Application Publication No. 2002/0044154 which is incorporated herein by reference.

The lens control elements of the GUIs 501, 502 are adjusted by the user via an input device 310 to control the characteristics of the lenses 510, 511 in the detail-in-context presentation 500. Using an input device 310 such as a mouse, a user adjusts parameters of the lens 510, 511 using icons and scroll bars of GUIs 501, 502 that are displayed over the lens on the display screen 340. The user may also adjust parameters of the image of the full scene 500. Signals representing input device 310 movements and selections are transmitted to the CPU 320 of the data processing system 300 where they are translated into instructions for lens control.

The bounding rectangle GUI 610 indicates the selected area for the cropped image 640. By moving the lenses 510, 511 on the display screen 310 with the lens GUIs 501, 502, the user can change the location of the corners 620, 630 (or regions-of-interest 520, 521) in the presentation 600. Of course, it is possible to use non-rectangular bounding GUIs for cropping. The bounding rectangle GUI 610 may be presented automatically upon placement of the lenses 510, 511 or its presentation may be selected using a pull-down menu selection, tool bar, crop icon, etc.

Observing the area enclosed by the bounding rectangle GUI 610, the user can decide whether or not the currently cropped image 640 accurately captures the desired area of the presentation 600. If the user is satisfied with the cropped image 640, the user may select the cropped image 640 by double clicking within the bounding rectangle GUI 610 or with a pull-down menu selection, crop icon, crop button, etc. The current cropped image 640 is thus selected for further processing, such as inclusion into a document being concurrently displayed in another window or replacement of the original presentation with the cropped image 640. Clicking on one of the corners 620, 630 will select the corresponding lens 510, 511 and GUI 501, 502 for adjustment. If the user is dissatisfied with the current cropped image 640, then the double clicking operation is avoided and instead a corner 620, 630 of the bounding rectangle GUI 610 can be moved to show a different cropped image 640.

By using detail-in-context lenses 510, 511 to select points 620, 630 defining an area for a cropped image 640, a user can view a large area 600 (i.e. outside the lenses 510, 511) while focusing in on smaller areas 520, 521 (i.e. inside the focal regions 520, 521 of the lenses 510, 511) surrounding the selected points 620, 630. This makes it possible for a user to perform accurate cropping without losing visibility or context of the portion of the original image surrounding the cropped area 640.

In the above embodiment, two lenses 510, 511 are added to the presentation 500 before the bounding rectangle GUI 610 is activated. However, according to another embodiment, the lenses 510, 511 and bounding rectangle GUI 610 can be combined. That is, the user may first add a lens 510 to a presentation 500 or the user may move a pre-existing lens into place at, say, the top left corner point 620 in FIG. 6. At this stage, before the second point 630 is selected, the bounding rectangle GUI 610 is activated. Now, to select the second point 630, the bottom right corner 650 of the bounding rectangle GUI 610 is moved (e.g. with a click and drag operation) by the user. As the bottom right corner 650 of the bounding rectangle GUI 610 is dragged, the second lens 511 is presented over and moves with the corner 650. This facilitates the accurate selection of the second point 630 for defining the cropped image 640.

In more detail, to select corner points 620, 630, the user first moves the mouse 310 to position a cursor 401 and depresses a mouse pushbutton to designate the first point or corner 620 of the desired cropped image 640. A first lens 510 is presented at this point. The location 620 of this first lens 510 or its characteristics may be adjusted as described above. The bounding rectangle GUI 610 is now activated by selecting from a pull-down menu for example. The first lens 510 is clicked and dragged to present the bounding rectangle GUI 610. As the mouse 310 is moved by the user to re-position the cursor 401 during the click and drag operation, the cursor's new position on the display 340 defines the second point or corner 630 diagonally opposite the first corner 620. The second lens 511 is presented over the second corner 630 during the click and draft operation. While the mouse 310 is moved with its pushbutton depressed (i.e. during the click and drag operation), a sequentially varying bounding rectangle GUI 610 for the potential cropped image 640 is displayed. If the user is satisfied with the cropped image 640, the user releases the mouse pushbutton to complete the click and drag operation. The user is then presented with a bounding rectangle GUI 610 with lens 510, 511 at opposite corners 620, 630. The user may then choose to complete the crop as described above (e.g. by double clicking within the bounding rectangle GUI 610).

As mentioned above, the bounding rectangle GUI 610 may have a shape other than rectangular. According to another embodiment, a polygonal shaped bounding GUI may be defined with three or more lens. In this case, the outline of the bounding GUI may pass through each lens. As the polygonal shape is drawn, say through an activation step, followed by a point and click to locate the first point, a series of click and drag operations to chose each subsequent point of the polygon, and ending with a double click operation, a lens is placed at each selected point or corner. Alternatively, between each click and drag operation when the crop line is being repositioned by the user via cursor and mouse, a lens may be presented over the end of the crop line (i.e. over the cursor's position). In other words, the end of the crop line is attached to a lens that moves with the crop line end as it is repositioned by a user. A lens may be left at each point or corner of the bounding polygon GUI with this alternative as well.

According to another embodiment, once a bounding rectangle or bounding polygon GUI has been established, a lens may be moved along the path of the bounding rectangle or polygon to allow a user to inspect the entire perimeter of the bounding rectangle or polygon. Thus, a user may accurately select each of the points along the perimeter of the bounding rectangle or polygon rather that just corners or line segment end points. In so doing, a more accurate cropped image 640 may be produced.

Measuring with Multiple Detail-In-Context Lenses.

Figure 7:
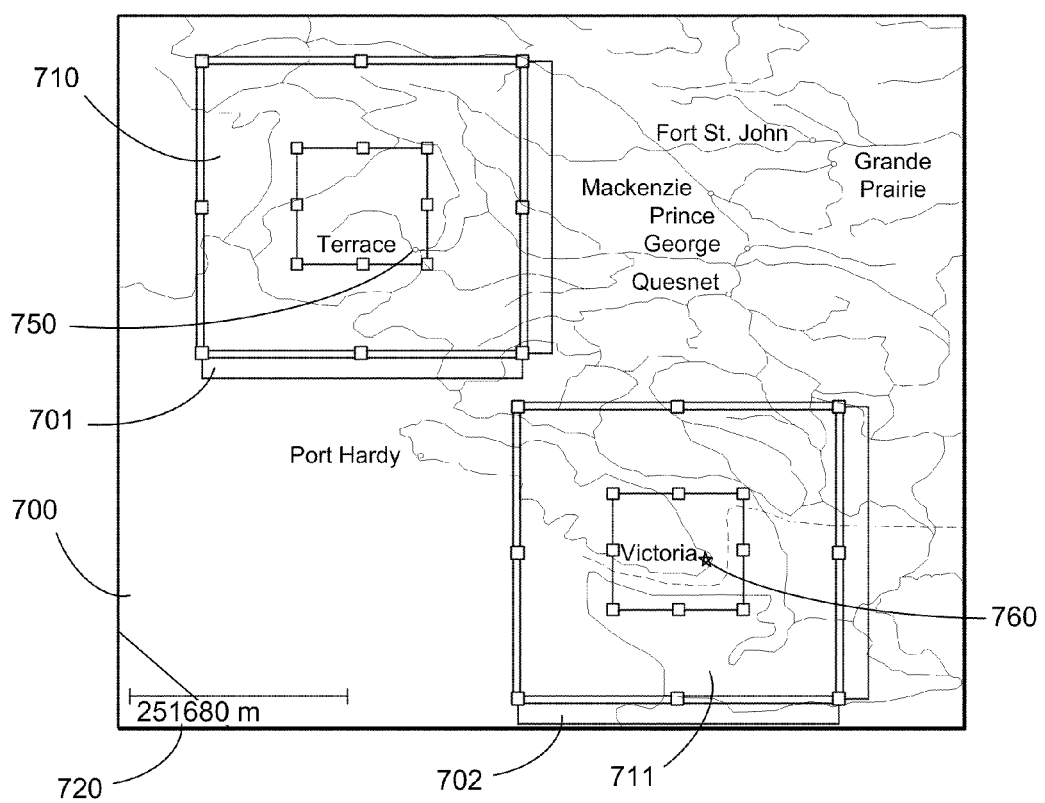
FIG. 7 is a screen capture illustrating a presentation having detail-in-context lenses and associated GUIs for selecting points between which to measure in an original digital image or representation in accordance with an embodiment.
Figure 8:
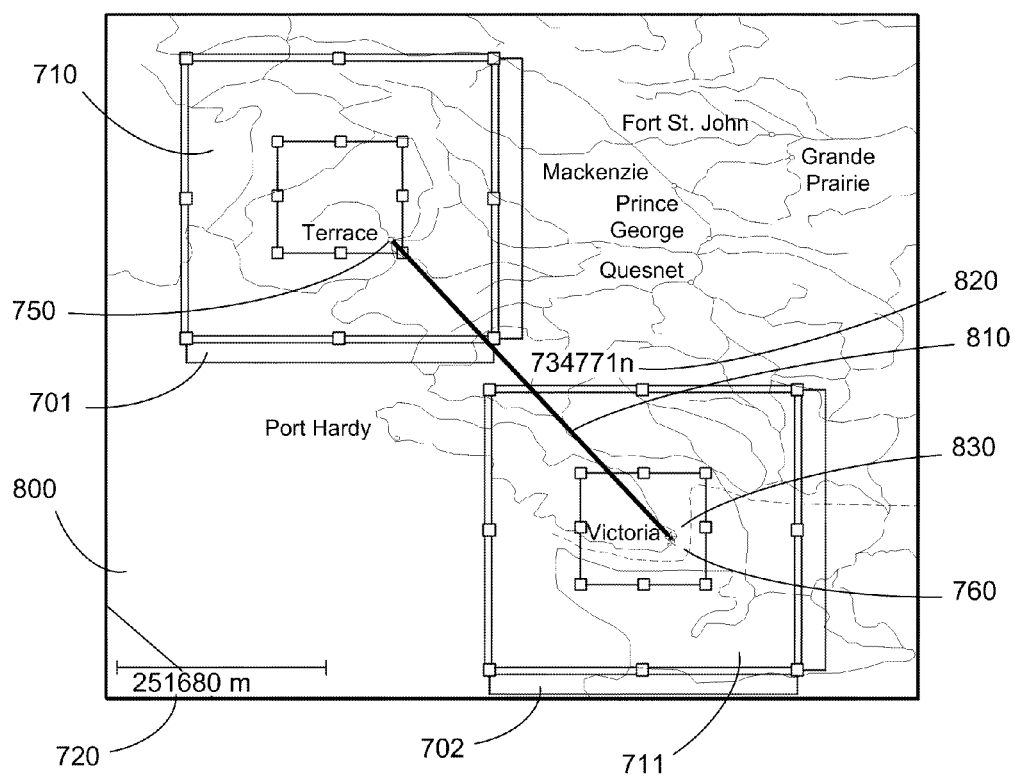
FIG. 8 is a screen capture illustrating a presentation having two detail-in-context lenses, associated GUIs, and a measuring tool GUI for displaying the measurement between selected points in an original digital image or representation in accordance with an embodiment.

In addition to performing cropping operations, measuring distances between points in a presentation can be performed with greater accuracy by using detail-in-context lenses. FIG. 7 is a screen capture illustrating a presentation 700 having detail-in-context lenses 710, 711 and associated GUIs 701, 702 for selecting points between which to measure in an original digital image or representation in accordance with an embodiment. To make a measurement between two points in an original digital image, a user first adds detail-in-context lenses 710, 711 to the original image to create a detail-in-context presentation 700. The lens 710, 711 enable the user to view high resolution data in the focus of each lens. The lenses are positioned over selected points 750, 760 and configured as described above. To aid the user in placing the lenses 710, 711, a scale icon 720 may be included in the presentation 700. FIG. 8 is a screen capture illustrating a presentation 800 having two detail-in-context lenses 710, 711, associated GUIs 701, 702, and a measuring tool GUI 810, 820 for displaying the measurement between selected points 750, 760 in an original digital image or representation in accordance with an embodiment. After selecting points 750, 760, the user may select a measuring tool to determine the distance between the points 750, 760. The measuring tool may be selected using a pull-down menu selection, tool bar, etc. In FIGS. 7 and 8, the points 750, 760 have been selected at the towns of Terrace and Victoria, British Columbia, respectively. The measuring tool may present a measuring tool GUI which may include a measured value icon 820 for displaying the measured value or distance between the selected points 750, 760 and a line segment icon 810 for displaying the measurement path between the selected points 750, 760 to a user. Advantageously, because the selected points 750, 760 are contained within the focal region of each lens 710, 711 which may be displayed at a higher resolution that the surrounding presentation 800, the measured value may be determined more accurately. In FIG. 8, the distance between Terrace and Victoria has a measure value 820 of 734, 771 meters.

In the above embodiment, two lenses 710, 711 are added to the presentation 700, 800 before the measuring tool GUI 810, 820 is activated. However, according to another embodiment, the lenses 710, 711 and measuring tool GUI 810, 820 can be combined. That is, the user may first add a lens 710 to a presentation 800 or the user may move a pre-existing lens into place at, say, the Terrace point 750 in FIG. 8. At this stage, before the Victoria point 760 is selected, the measuring tool GUI 810, 820 is activated. Now, to select the second point 763, the end point 830 of the line segment icon 810 (i.e., the point over the cursor's position) is moved (e.g., with a click and drag operation) by the user. As the end point 830 of the line segment icon 810 is dragged, the second lens 711 is presented over and moves with the end point 830. This facilitates the accurate selection of the second point 760 for defining the distance to be measured (i.e. the line segment between points 750, 760). In addition, at the end of every intermediate line segment, a new lens may be added to the presentation.

Cropping with a Single Detail-In-Context Lens.

Above methods for cropping and measuring an original image are described in which multiple lenses are used. In the following, embodiments for cropping and measuring using a single lens are described. The lens may be a carrier for the cropping or measurement tool, or the lens may be the tool itself. In both the single lens and multiple lenses embodiments, accuracy of cropping and measurement may be improved.

Figure 9:
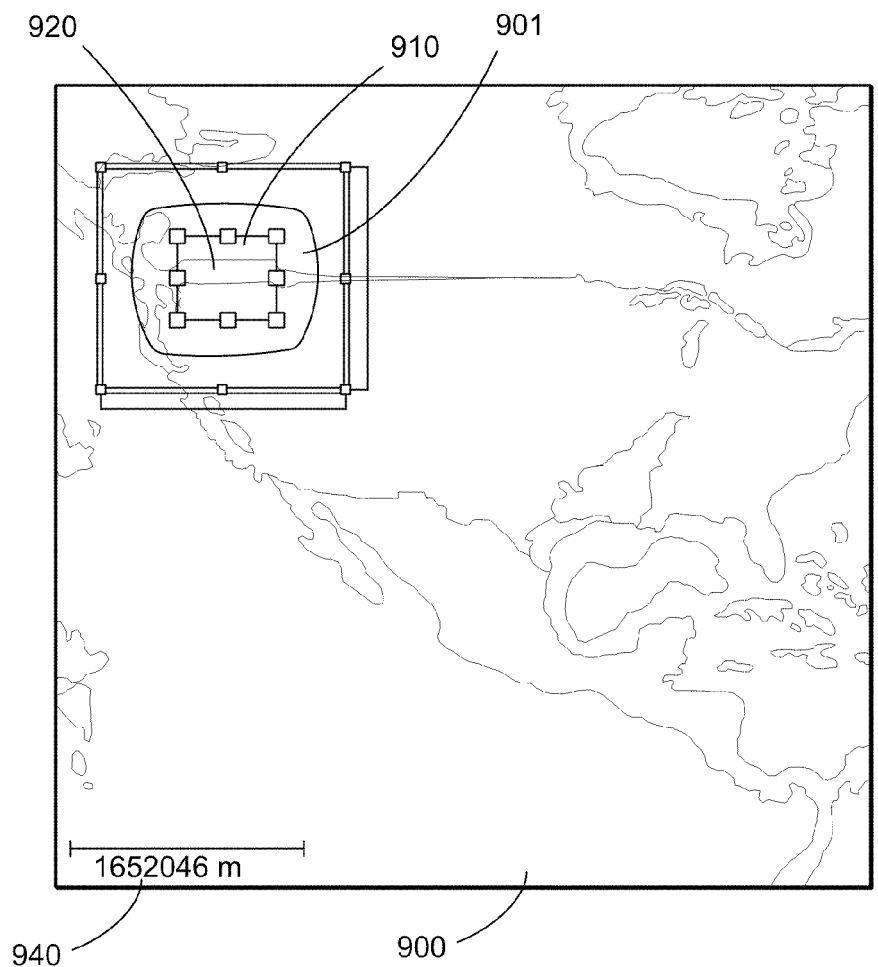
FIG. 9 is a screen capture illustrating a presentation having a single detail-in-context lens and associated GUI for defining the corners of a bounding rectangle GUI for cropping an original digital image or representation in accordance with an embodiment.
Figure 10:
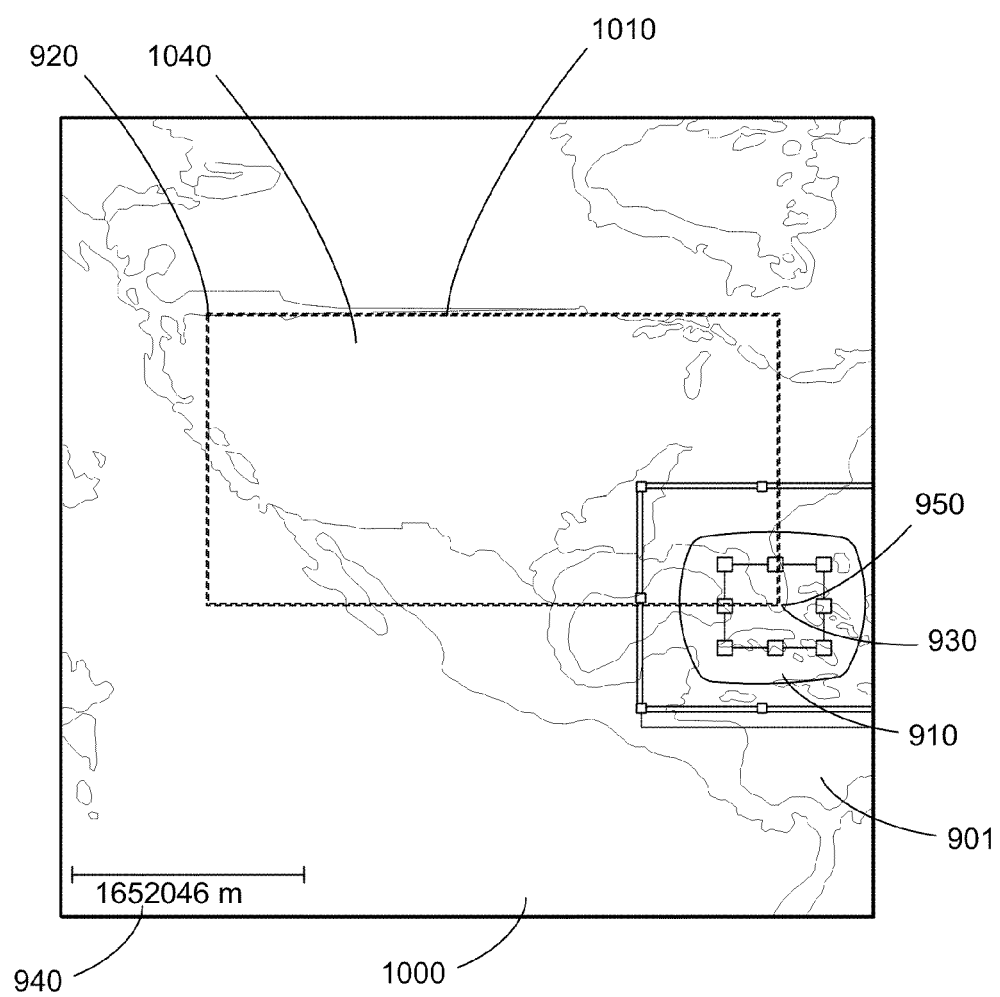
FIG. 10 is a screen capture illustrating a presentation having a single detail-in-context lens, an associated GUI, and a bounding rectangle GUI or icon for cropping an original digital image or representation to produce a cropped image in accordance with an embodiment.

FIG. 9 is a screen capture illustrating a presentation 900 having a single detail-in-context lens 910 and associated GUI 901 for defining the corners of a bounding rectangle GUI for cropping an original digital image or representation in accordance with an embodiment. To aid the user in placing the lens 910, a scale icon 940 may be included in the presentation 900. To crop the original image, the user first selects the cropping tool (which is associated with a lens 910) using a pull-down menu selection, tool bar, etc., and then selects a starting or first point 920 using a point and click operation. This places a lens 910 and an associated GUI 901 over the first point 920. Next, the user drags the lens 910 to the second point 930 to complete the definition of the bounding rectangle GUI or icon 1010 and hence define the cropped image 1040 as is shown in FIG. 10. FIG. 10 is a screen capture illustrating a presentation 1000 having a single detail-in-context lens 910, an associated GUI 901, and a bounding rectangle GUI or icon 1010 for cropping an original digital image or representation to produce a cropped image 1040 in accordance with an embodiment. The bounding rectangle GUI 1010 may be dynamically presented as the lens 910 is dragged diagonally from the first point 920 to the second point 930. The bounding rectangle GUI 1010 defines the area of the cropped image 1040.

Thus, for example, the bounding rectangle GUI 1010 may be drawn by first activating the tool (e.g., tool bar, etc.), followed by a point and click operation to locate the first point or corner 920, while maintaining a depressed mouse selection button, a drag operation during which the lens 910 is presented over the end of the crop line 950 (i.e., over the cursor's position, that is, the end of the crop line 950 is attached to the lens 910 which moves with the crop line end 950 as it is repositioned by a user), and a mouse selection button release to select the second point or corner 930. During this process, the bounding rectangle GUI 1010 is dynamically presented as the end of the crop line 950 is moved by the user.

The bounding rectangle GUI 1010 may have a shape other than rectangular. According to another embodiment, a polygonal shaped bounding GUI may be defined with three or more lens. In this case, the outline of the bounding GUI may pass through each lens. The polygonal shaped bounding GUI may be drawn, say, through an activation step, followed by a point and click to locate the first point, a series of click and drag operations to chose each subsequent point of the polygon, and ending with a double click operation that leaves a lens placed over the last selected point or corner. Between each click and drag operation when the crop line is being repositioned by the user via cursor and mouse, a lens may be presented over the end of the crop line (i.e. over the cursor's position). In other words, the end of the crop line is attached to a lens that moves with the crop line end as it is repositioned by a user.

According to another embodiment, when the cropping tool is activated (e.g. by a drop-down menu selection, tool bar, etc.) and when the standard cursor 401 is located within the presentation 900, 1000, an alternate cursor icon may be displayed over the presentation 900, 1000 to replace the cursor 401 or may be displayed in combination with the cursor 401. The alternate cursor icon may be a lens 910, a cropping cursor icon (not shown), or a combination lens 910 and cropping cursor icon.

Measuring with a Single Detail-In-Context Lens

Figure 11A:
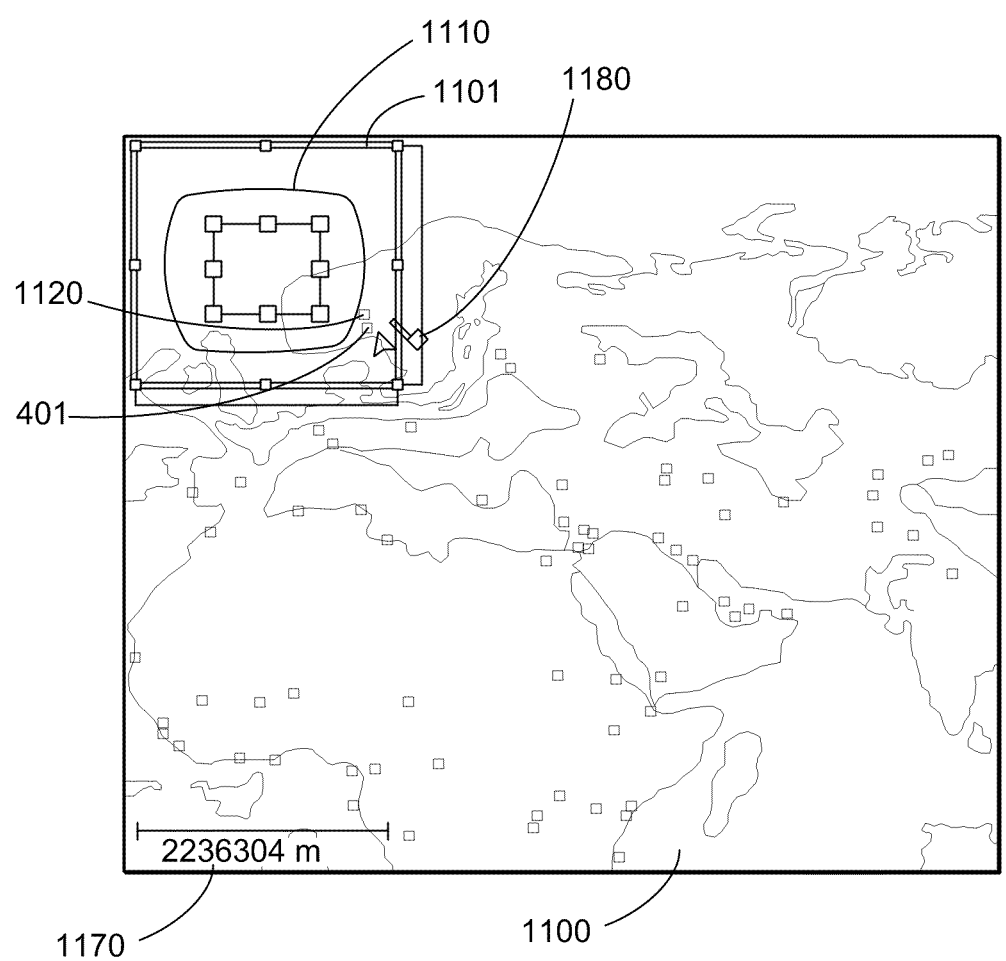
FIG. 11A is a screen capture illustrating a presentation having a single detail-in-context lens and an associated GUI for selecting points between which to measure in an original digital image or representation in accordance with an embodiment.
Figure 11B:
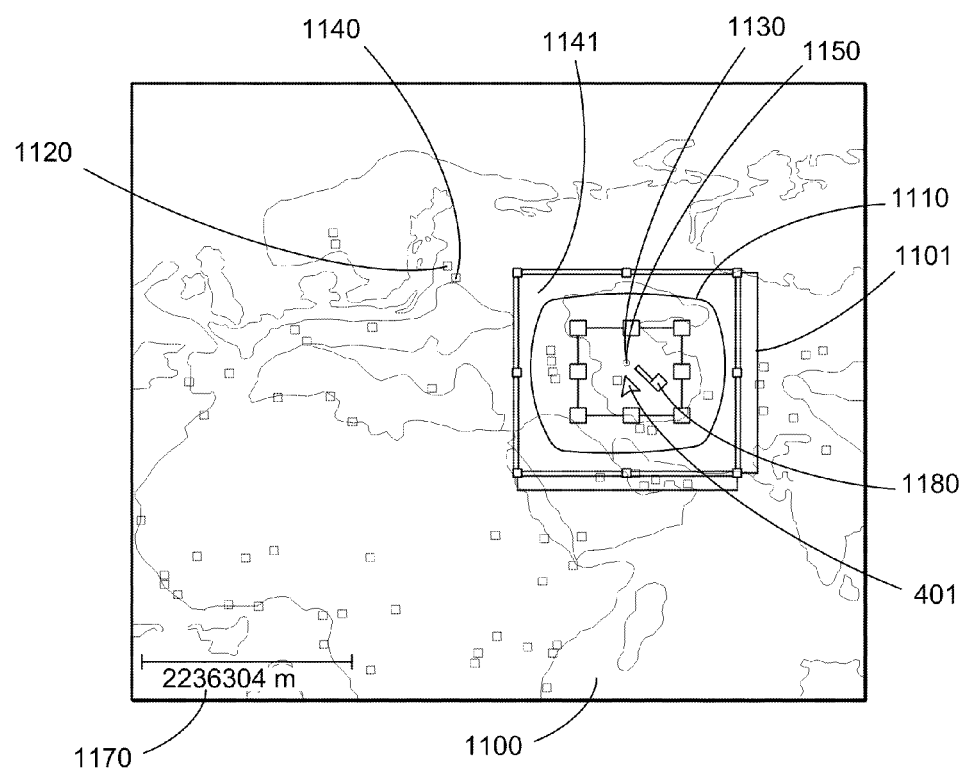
FIG. 11B is a screen capture illustrating a presentation having a single detail-in-context lens, an associated GUI, and a measuring tool GUI for displaying the measurement between two selected points in an original digital image or representation in accordance with an embodiment.

FIG. 11A is a screen capture illustrating a presentation 100 having a single detail-in-context lens 1110 and an associated GUI 1101 for selecting points between which to measure in an original digital image or representation in accordance with an embodiment. FIG. 11B is a screen capture illustrating a presentation 1100 having a single detail-in-context lens 1110, an associated GUI 1101, and a measuring tool GUI 1140, 1141, for displaying the measurement between selected points 1120, 1130 in an original digital image or representation in accordance with an embodiment. And, FIG. 11C is a screen capture illustrating a presentation 1100 having a single detail-in-context lens 1110, an associated GUI 1101, and a measuring tool GUI 1140, 1142, 1142, 1143 for displaying the measurement between selected points 1120, 1130, 1160 in an original digital image or representation in accordance with an embodiment.

To make a measurement in the original image 1100, the user first selects the measuring tool (which is associated with a lens 1110) using a pull-down menu selection, tool bar, etc., and then selects a starting or first point 1120 using a point and click operation. This places a lens 1110 and an associated GUI 1101 over the first point 1120 as shown in FIG. 1A. A measuring tool icon 1180 may also be displayed over the first point 1120 as mentioned above. The lens 1110 enables the user to view high resolution data in its focus. Next, the user drags the lens 1110 to select a second point 1130 for the measurement as shown in FIG. 1B. The measuring tool may present a measuring tool GUI which may include a measured value icon 1141 for displaying the measured value or distance between the selected points 1120, 1130 and a line segment icon 1140 for displaying the measurement path between the selected points 1120, 1130 as shown in FIG. 11B. The measuring tool GUI 1140, 1141 may be dynamically presented as the lens 1110 is dragged from the first point 1120 to the second point 1130.

Figure 11C:
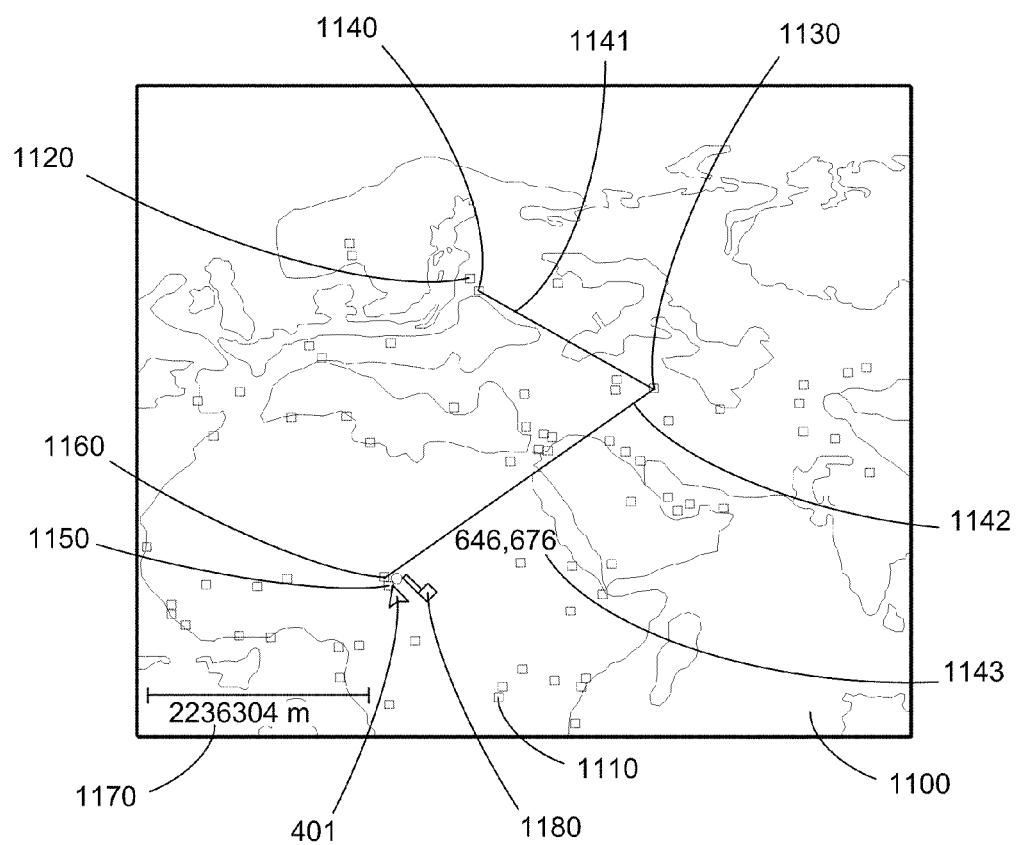
FIG. 11C is a screen capture illustrating a presentation having a single detail-in-context lens, an associated GUI, and a measuring tool GUI for displaying the measurement between multiple selected points in an original digital image or representation in accordance with an embodiment.

As shown in FIGS. 11B and 11C, a user may make linked measurements in one or more operations. Linked line segment icons 1140, 1142 may be drawn, say, through an activation step, followed by a point and click to locate the first point 1120, a series of click and drag operations to chose each subsequent point 1130, 1160 of the linked line segment, and ending with a double click operation that leaves a lens 1110 placed over the last selected point 1160. Between each click and drag operation when the line segment icon 1140, 1142 is being repositioned by the user via cursor and mouse, a lens 1110 may be presented over the end of the line segment 1150 (i.e. over the cursor's position). In other words, the end of the line segment 1150 is attached to a lens 1110 that moves with the end of the line segment 1150 as it is repositioned by a user.

To aid the user in placing the lens 1110, a scale icon 1170 may be included in the presentation 1100. In addition, when the measuring tool is activated (e.g. by a drop-down menu selection, tool bar, etc.) and when the standard cursor 401 is located within the presentation 1100, an alternate cursor icon may be displayed over the presentation 1100 to replace the cursor 401 or may be displayed in combination with the cursor 401. The alternate cursor icon may be a lens 1110, a measuring cursor icon 1180, or a combination lens 1110 and measuring cursor icon 1180. Moreover, as shown in FIG. 11B, the line segment icon 1140 may be presented as an exclusive OR (XOR) with the underlying portion of the original or background image 1100.

Cropping Method

Figure 12:
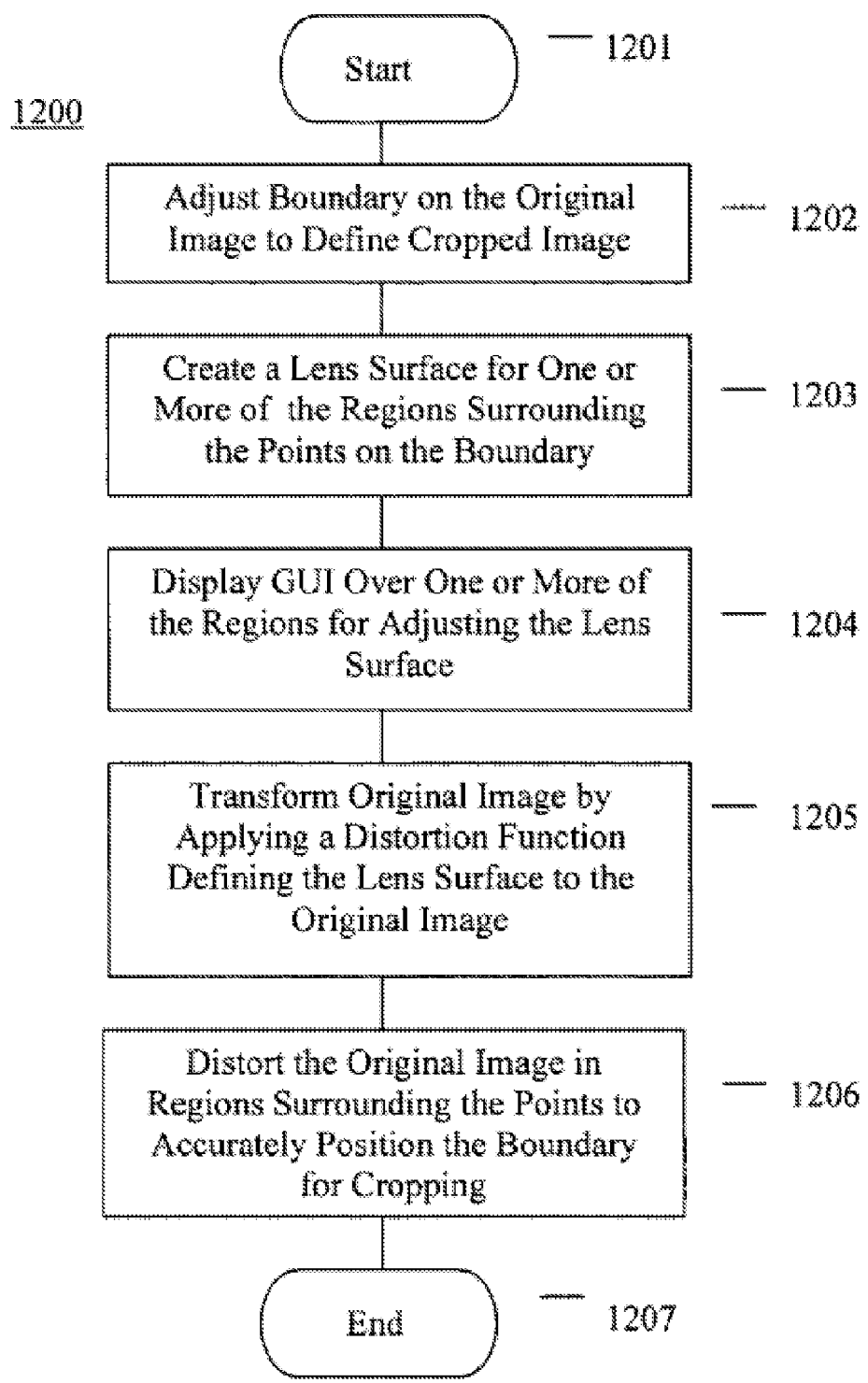
FIG. 12 is a flow chart illustrating a method for cropping a computer generated original image on a display in accordance with an embodiment.

FIG. 12 is a flow chart 1200 illustrating a method for cropping a computer generated original image on a display 340 in accordance with an embodiment. At block 1201, the method starts.

At block 1202, a user-selected movable boundary 610, 1010 on the original image is adjusted to define a cropped image 640, 1040 within the boundary, the boundary being defined by two or more points 620, 630, 920, 930 on the original image.

At block 1203, a lens surface 510, 511, 910 is created for one or more of the regions surrounding the points 620, 630, 920, 930.

At block 1204, a GUI 501, 502, 901 is displayed over one or more of the regions for adjusting the lens surface 510, 511, 910.

At block 1205, the original image is transformed by applying a distortion function defining the lens surface to the original image.

At block 1206, the original image is distorted 500, 600, 900, 1000 in regions surrounding the points, whereby the boundary 610, 1010 is accurately positioned for cropping.

At block 1207, the method ends.

Figure 13:
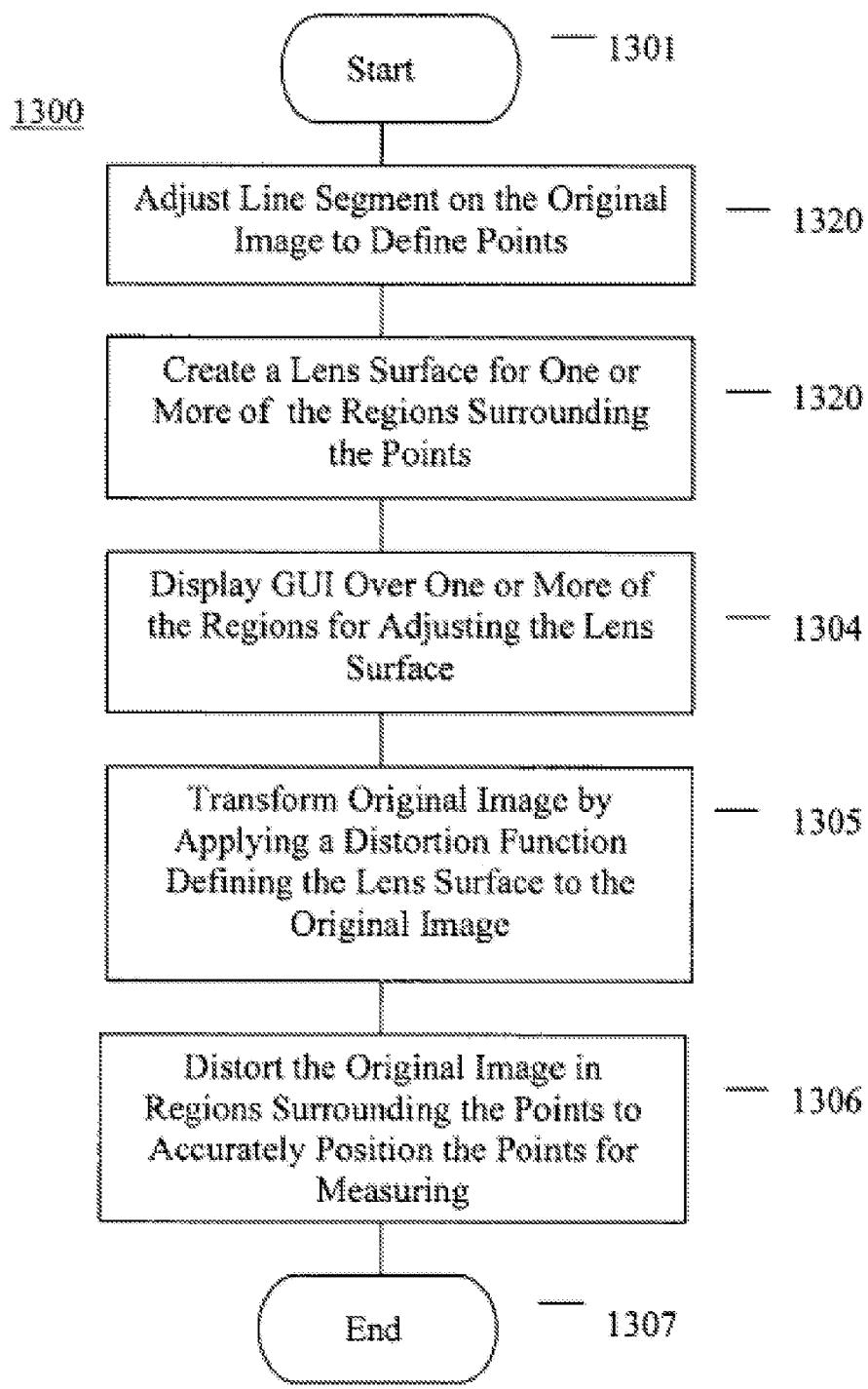
FIG. 13 is a flow chart illustrating a method for measuring within a computer generated original image on a display in accordance with an embodiment.

FIG. 13 is a flow chart 1300 illustrating a method for measuring within a computer generated original image on a display 340 in accordance with an embodiment. At block 1301, the method starts.

At block 1302, a user-selected movable line segment 810, 1140, 1142 on the original image is adjusted to define points 750, 760, 1120, 1130, 1160 on the original image for measuring between.

At block 1303, a lens surface 710, 711, 1110 is created for one or more of the regions surrounding the points 750, 760, 1120, 1130, 1160.

At block 1304, a GUI 701, 702, 1101 is displayed over one or more of the regions for adjusting the lens surface 710, 711, 1110.

At block 1305, the original image is transformed by applying a distortion function defining the lens surface to the original image.

At block 1306, the original image is distorted 700, 800, 1100 in regions surrounding the points, whereby the points 750, 760, 1120, 1130, 1160 are accurately positioned for measuring.

At block 1307, the method ends.

Portable Device

Figure 14:
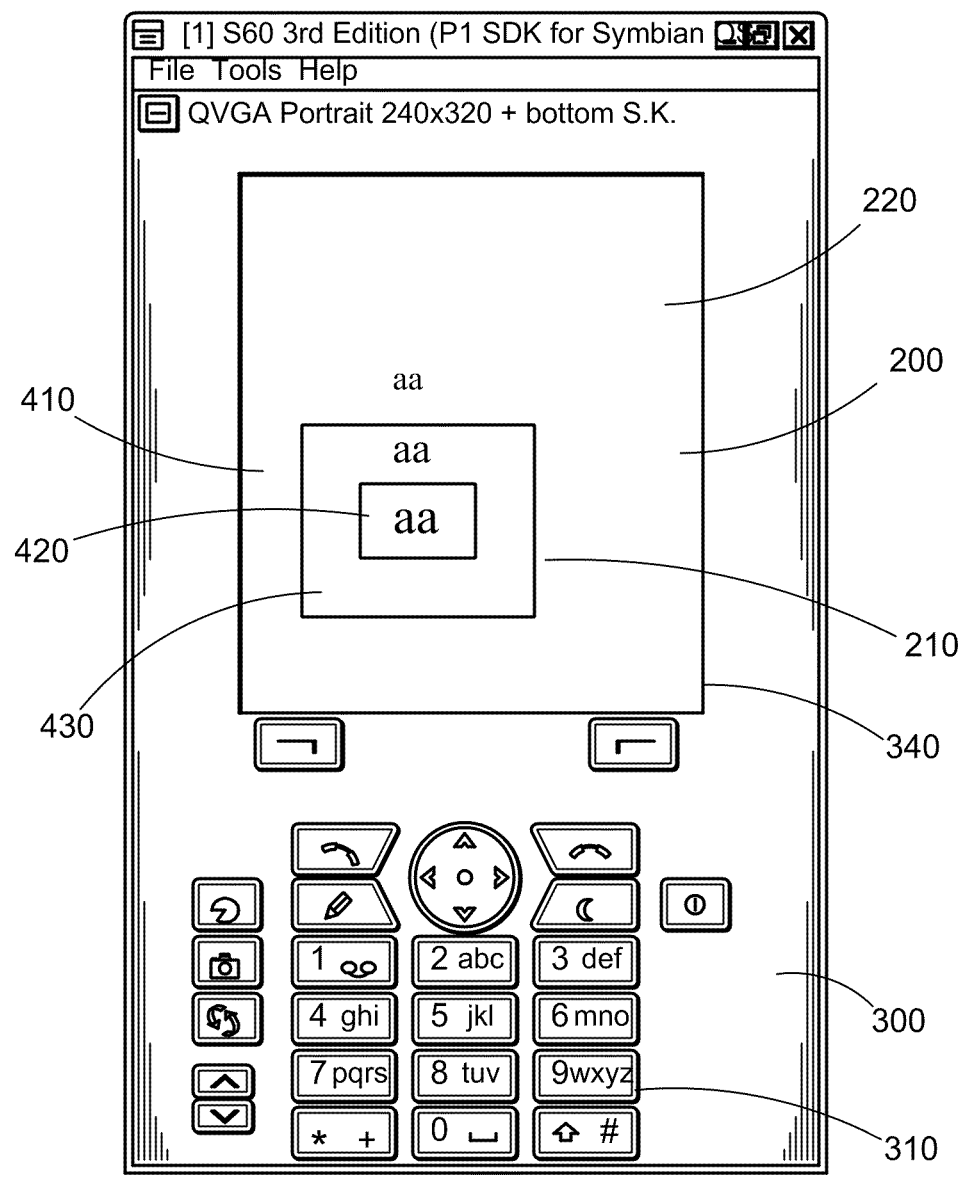
FIG. 14 is a front view illustrating a portable device adapted for implementing an embodiment.

FIG. 14 is a front view illustrating a portable device that is configured to implement one or more of the techniques described herein. In general, the portable device has the functionality or at least a subset of the functionality of the data processing system 300 of FIG. 1. The portable device includes a display screen 340 and an input device (i.e., a keypad, trackball, and various function keys) 310. A detail-in-context presentation 200 including an area 210 to which a lens 410 has been applied is displayed on the display screen 340. The detail-in-context presentation 200 is generated by applying the lens 410 to a region-of-interest 391 in an original image 393. Note that the lens area 210 is typically a small subset, portion, or subarea of the total area 200 of the display 340. According to one embodiment, the lens 410 may be an inset magnifier. According to another embodiment, the lens 410 may be a detail-in-context lens.

According to one embodiment, a novel use of detail-in-context lens technology for devices 300 having electronic displays 340 is provided with a view to reducing display power consumption and hence conserving the battery life of such devices 300. The area 210 of the presentation 200 where the lens 410 has been applied generally corresponds to the primary area-of-interest or region-of-interest for the user in the original image 393. Since this is the area where the user desires improved visibility the most in an implementation, this lens area 210 is given a higher brightness than the surrounding area 220, or correspondingly, the surrounding area 220 is dimmed, so as to conserve battery life by not illuminating the display fully in areas where the user does not need it. In this way, display power consumption may be reduced and hence battery life may be extended. According to one embodiment, display power consumption is reduced due to the reduced brightness in and hence reduced power consumption by that portion of the display 340 corresponding to the area 220 outside the lens area 210. As mentioned above, the lens area 210 is typically smaller than the surrounding area 220 of the presentation 200.

The resulting difference in illumination is also useful as a visual cue to help make the user aware of the presence of the lens 410, and as such may also be varied over the lens surface including the lens' focal and shoulder regions 420, 430 in the case of a detail-in-context lens 410. For example, the focal region 420 may be the brightest and brightness may diminish across the shoulder region 430 to a base level of brightness in the area 220 outside the lens area 210.

The techniques described herein are well suited to devices using LED technology based displays 340 where the brightness can be locally varied with locally variable power consumption, and may be applied to other display technologies, in any case where decreasing brightness locally will decrease power consumption and thus extend battery life.

According to one embodiment, contrast may also be varied locally, in a manner defined by the lens' location and shape, for example, in cases where power consumption and hence battery life is contrast dependent.

According to one embodiment, the local brightness or contrast adjustment defined with the lens 410 may be coupled with gaze-tracking capabilities or other position input such as remote control of lens location or GPS-based lens control.

According to one embodiment, brightness and/or contrast may be adjusted by a GUI 400 as described below. In this embodiment, hardware and/or software modules 331 in the data processing system or portable device 300 receive one or more signals from brightness and/or contrast lens control elements 404, 406 (as described previously) of the GUI 400 and use these one or more signals to adjust brightness and/or contrast of the display screen 340 accordingly.

It should be understand that the apparatus discussed above with reference to a data processing system 300 (e.g., the portable device) may be programmed to enable the practice of the techniques described herein. Moreover, an article of manufacture for use with a data processing system 300 (e.g., the portable device), such as a pre-recorded storage device or other similar computer readable medium including program instructions recorded thereon, may direct the data processing system 300 (e.g., the portable device) to facilitate the practice of the techniques. It is understood that such apparatus and articles of manufacture also come within the scope thereof.

In particular, the sequences of instructions which when executed cause the method described herein to be performed by the data processing system 300 (e.g., the portable device) can be contained in a data carrier product. This data carrier product can be loaded into and run by the data processing system 300 (e.g., the portable device). In addition, the sequences of instructions which when executed cause the method described herein to be performed by the data processing system 300 (e.g., the portable device) can be contained in a computer software product. This computer software product can be loaded into and run by the data processing system 300 (e.g., the portable device). Moreover, the sequences of instructions which when executed cause the method described herein to be performed by the data processing system 300 (e.g., the portable device) can be contained in an integrated circuit product (e.g., a hardware module or modules) which may include a coprocessor or memory according to one embodiment of the invention. This integrated circuit product can be installed in the data processing system 300 (e.g., the portable device).

The embodiments described above are exemplary. Those skilled in the art will understand that various modifications of detail may be made to these embodiments.

What is claimed is:

1. A method comprising:
   distorting an image for display on a display device to give an appearance of a lens being applied to the image; and
   adjusting a brightness level of the appearance of the lens for display on the display device such that the brightness level of the appearance of the lens differs from a brightness level of a portion of the image outside the appearance of the lens,
   wherein:
   the appearance of the lens includes a shoulder region that surrounds a focal region, the shoulder region having a magnification that varies from a magnification of the focal region to provide a transition from the focal region to the portion of the image outside the appearance of the lens; and
   the brightness level of the appearance of the lens varies across the appearance of the lens.

2. The method of claim 1, wherein the adjusting is performed in response to interaction with one or more icons in a graphical user interface.

3. The method of claim 2, where the one or more icons are a slide bar.

4. The method of claim 1, further comprising causing display of a graphical user interface ("GUI") on the display for adjusting the appearance of the lens.

5. The method of claim 1, wherein the focal region has a size and a shape and further comprising receiving one or more signals for adjusting at least one of the size, the shape, or the magnification of the focal region.

6. The method of claim 5, wherein the one or more signals for adjusting at least one of the size, the shape, or the magnification of the focal region are received via a graphical user interface ("GUI").

7. The method of claim 6, wherein the GUI includes at least one of:
   a slide bar icon for adjusting a magnification for the appearance of the lens;
   a slide bar icon for adjusting a degree of scooping for the appearance of the lens;
   a bounding rectangle icon with at least one handle icon for adjusting the size or the shape for the focal region;
   a bounding rectangle icon with at least one handle icon for adjusting a size or a shape for the shoulder region;
   a move icon for adjusting a location for the appearance of the lens within an undistorted region of the image;
   a pickup icon for adjusting a location for the shoulder region within the undistorted region of the image; or
   a fold icon for adjusting a location for the focal region relative to the shoulder region.

8. The method of claim 1, wherein the adjusting is performed by decreasing the brightness level of the portion of the image outside the appearance of the lens.

9. The method of claim 1, wherein the brightness level of the appearance of the lens diminishes from the focal region to the portion of the image outside of the appearance of the lens.

10. A method comprising:
   distorting an image for display on a display device to give an appearance of a lens being applied to the image; and
   adjusting a contrast level of the appearance of the lens for display on the display device such that the contrast level of the appearance of the lens differs from a contrast level of a portion of the image outside the appearance of the lens,
   wherein:
      the appearance of the lens includes a shoulder region that surrounds a focal region, the shoulder region having a magnification that varies from a magnification of the focal region to provide a transition from the focal region to the portion of the image outside the appearance of the lens; and
      the contrast level of the appearance of the lens varies across the appearance of the lens.

11. The method of claim 10, wherein the adjusting is performed in response to interaction with one or more icons in a graphical user interface.

12. The method of claim 11, where the one or more icons are a slide bar.

13. The method of claim 10, further comprising causing display of a graphical user interface ("GUI") on the display for adjusting the appearance of the lens.

14. The method of claim 10, wherein the focal region has a size and a shape and further comprising receiving one or more signals for adjusting at least one of the size, the shape, or the magnification of the focal region.

15. The method of claim 14, wherein the one or more signals for adjusting at least one of the size, the shape, or the magnification of the focal region are received via a graphical user interface ("GUI").

16. The method of claim 15, wherein the GUI includes at least one of:
   a slide bar icon for adjusting a magnification for the appearance of the lens;
   a slide bar icon for adjusting a degree of scooping for the appearance of the lens;
   a bounding rectangle icon with at least one handle icon for adjusting the size or the shape for the focal region;
   a bounding rectangle icon with at least one handle icon for adjusting a size or a shape for the shoulder region;
   a move icon for adjusting a location for the appearance of the lens within an undistorted region of the image;
   a pickup icon for adjusting a location for the shoulder region within the undistorted region of the image; or
   a fold icon for adjusting a location for the focal region relative to the shoulder region.

17. The method of claim 10, wherein the adjusting is performed by decreasing the contrast level of the portion of the image outside the appearance of the lens.

18. The method of claim 10, wherein the contrast level of the appearance of the lens diminishes from the focal region to the portion of the image outside of the appearance of the lens.

* * * * *